US012771607B2

(12) United States Patent
Hansen

(10) Patent No.: US 12,771,607 B2
(45) Date of Patent: Oct. 20, 2026

(54) SYSTEM, METHOD, AND DEVICE FOR MODIFYING NETWORK FUNCTIONALITY BASED ON PROVIDED PASSPHRASE

(71) Applicant: SoundVision Technologies, LLC, Hurricane, UT (US)

(72) Inventor: Jeffrey Alma Hansen, Draper, UT (US)

(73) Assignee: SoundVision Technologies, LLC, Hurricane, UT (US)

( * ) Notice: Subject to any disclaimer, the term of this patent is extended or adjusted under 35 U.S.C. 154(b) by 57 days.

(21) Appl. No.: 19/086,040

(22) Filed: Mar. 20, 2025

(65) Prior Publication Data

US 2025/0219907 A1 Jul. 3, 2025

Related U.S. Application Data

(63) Continuation-in-part of application No. 18/778,873, filed on Jul. 19, 2024, which is a continuation of application No. 18/545,817, filed on Dec. 19, 2023, now Pat. No. 12,047,240.

(60) Provisional application No. 63/476,143, filed on Dec. 19, 2022.

(51) Int. Cl.

| | |
|---|---|
| ***H04L 41/0894*** | (2022.01) |
| ***H04W 12/04*** | (2021.01) |
| ***H04W 12/041*** | (2021.01) |
| ***H04W 12/06*** | (2021.01) |
| ***H04W 12/08*** | (2021.01) |

(52) U.S. Cl.

CPC ......... *H04L 41/0894* (2022.05); *H04W 12/04* (2013.01); *H04W 12/041* (2021.01); *H04W 12/06* (2013.01); *H04W 12/08* (2013.01)

(58) Field of Classification Search

CPC ............ H04L 41/0894; H04W 12/04; H04W 12/041; H04W 12/06; H04W 12/08

See application file for complete search history.

(56) References Cited

U.S. PATENT DOCUMENTS

| | | | | |
|---|---|---|---|---|
| 10,096,220 | B2 * | 10/2018 | Mookan | H04L 67/54 |
| 10,999,198 | B2 * | 5/2021 | Miu | H04L 45/66 |
| 11,418,515 | B2 * | 8/2022 | Achari | H04L 41/0806 |
| 2005/0198319 | A1 | 9/2005 | Chan | |

(Continued)

*Primary Examiner* — Chau Le

(74) *Attorney, Agent, or Firm* — Pacer K. Udall; Booth Udall, PLC

(57) ABSTRACT

A method for modifying functionality within a wireless network based on an applied authentication asset is disclosed that includes: defining a first set of network policies and a second set of network policies associated with a first authentication asset and a second authentication asset, respectively, for the wireless network, the second authentication asset being different from the first authentication asset; determining if the applied authentication asset used by a client device while engaging in an authentication process with an authentication server to secure a network connection with the wireless network matches one of the first authentication asset and the second authentication asset; and providing the network connection defined at least in part by the first set or the second set of network policies if the applied authentication asset is the first authentication asset and the second authentication asset, respectively to the client device through a mutable network device.

27 Claims, 18 Drawing Sheets

(56) References Cited

U.S. PATENT DOCUMENTS

| | | | | |
|---|---|---|---|---|
| 2012/0257502 | A1* | 10/2012 | Le Sage | H04L 47/125 370/235 |
| 2013/0122910 | A1 | 5/2013 | Singh | |
| 2018/0061202 | A1 | 3/2018 | Mookan | |
| 2020/0382516 | A1 | 12/2020 | Achari et al. | |
| 2021/0014276 | A1 | 1/2021 | Nishijima | |
| 2021/0258253 | A1 | 8/2021 | Lun | |
| 2022/0417742 | A1* | 12/2022 | Dey | H04W 12/04 |
| 2023/0136319 | A1 | 5/2023 | Logan | |

* cited by examiner

700

800

SYSTEM, METHOD, AND DEVICE FOR MODIFYING NETWORK FUNCTIONALITY BASED ON PROVIDED PASSPHRASE

RELATED APPLICATIONS

This application is a continuation-in-part of U.S. patent application Ser. No. 18/778,873, filed Jul. 19, 2024, titled "System, Method, and Device for Modifying Network Functionality Based on Provided Passphrase", which is a continuation of U.S. patent application Ser. No. 18/545,817, filed Dec. 19, 2023, now U.S. Pat. No. 12,047,240, issued Jul. 23, 2024, titled "System, Method, and Device for Modifying Network Functionality Based on Provided Passphrase", which application claims the benefit of U.S. Provisional Patent Application 63/476,143, filed Dec. 19, 2022, titled "System and Method for Modifying Network Functionality Based on Provided Passphrase," the entirety of all the disclosures of which are hereby incorporated by this reference.

TECHNICAL FIELD

Aspects of this document relate generally to the management of wireless networks.

BACKGROUND

Between mobile devices becoming a near-universal part of daily life and the development of low-power, inexpensive wireless network interfaces enabling practical Internet of Things (IOT) devices and smart home accessories, wireless networks have never been more ubiquitous.

These networks can be found in almost any context, ranging from stadium networks providing connectivity to thousands of attendees, to the small network provided to customers of a coffee shop, all the way down to a home wireless network dedicated to connecting the various devices used by one family, or even one individual.

One consequence of this is the proliferation of wireless networks. At any given time, a device will typically be "hearing" from multiple networks, each broadcasting a different name (i.e., SSID). Even simple use cases, like a home network, may involve multiple SSIDs (e.g., a personal network, a guest network, different frequency bands used by different technologies, etc.), which can lead to confusion.

Additionally, some desired functionalities have been provided in the smaller-scale use cases, such as a home network, that also introduce additional obstacles. For example, some networks can be configured to only provide internet access within a defined time window, a feature of interest to families with children. However, in conventional networks such functionality is either: enforced for the entire network (an irritation for the adults), dependent upon the creation of an entirely separate network and passphrase, or necessitates the definition of per-device permissions, an additional obstacle to network access that must be dealt with each time a new device is introduced to the home.

Similar issues exist in other use contexts where it is desirable to provide different functionalities to different sets of users or devices. Conventional solutions to these problems are most often confined to expensive enterprise-grade equipment, complicated open-source solutions, and/or the expense and complexity of incorporating additional layers of authentication, such as RADIUS. The conventional technologies that address the needs for thousands of users are not practical for the network of a few dozen customers, or a family in their home.

SUMMARY

According to one aspect, a mutable network device for a wireless network is disclosed that includes: a wired network interface communicatively coupled to a wired network; and a processor and a memory, the processor communicatively coupled to the wired network interface and configured to: define a first set of network policies and associate the first set of network policies with a first authentication asset; define a second set of network policies and associate the second set of network policies with a second authentication asset, the second authentication asset being different from the first authentication asset; receive an applied authentication asset that is related to a client device engaging in an authentication process to secure a network connection between the client device and a wireless network; determine if the applied authentication asset matches one of the first authentication asset and the second authentication asset; receive a confirmation from an authentication server that the client device has been authenticated; and configure a traffic kernel module to provide the network connection to the client device, the network connection defined at least in part by the first set of network policies if the applied authentication asset is the first authentication asset and defined at least in part by the second set of network policies if the applied authentication asset is the second authentication asset. The first set of network policies and the second set of network policies each comprise at least one network policy. Each network policy describes a network functionality to be provisioned through the network connection. The first set of network policies differs from the second set of network policies by at least a unique network policy that is found exclusively in one of the first set of network policies and the second set of network policies.

Implementations may include one or more or all of the following.

The authentication server is a RADIUS server.

The applied authentication asset is received from the client device while the client device is engaging in the authentication process.

The applied authentication asset is at least part of a username.

The processor is further configured to: receive the username from the client device; and send an Access-Request message including the username to the authentication server.

The applied authentication asset is received from the authentication server as part of the authentication process, the applied authentication asset being a Server-Assigned Attribute.

The Server-Assigned Attribute is a Vendor-Specific Attribute.

The processor is further configured to: define a default network policy including a network functionality that is applied to every network connection; determine if the network functionality is preempted by another network policy being enforced in response to the client device completing the authentication process; and apply the network functionality of the default network policy to the network connection unless the network functionality is determined to be preempted.

The unique network policy includes a policy exception that preempts and negates the default network policy.

The unique network policy is a scheduled network policy including a schedule and a network functionality that is periodically applied to the network connection according to the schedule.

The network functionality is a network access that is only available according to the schedule.

The processor is further configured to redirect the client device to a captive portal in response to the client device attempting to utilize the network access at a time prohibited by the schedule, and the captive portal includes a user interface through which a schedule exception can be requested.

The unique network policy applies a filter to the network connection.

According to another aspect, a method for modifying functionality within a wireless network based on an applied authentication asset is disclosed that includes: defining a first set of network policies associated with a first authentication asset for the wireless network; defining a second set of network policies associated with a second authentication asset for the wireless network, the second authentication asset being different from the first authentication asset; determining if the applied authentication asset used by a client device while engaging in an authentication process with an authentication server to secure a network connection with the wireless network matches one of the first authentication asset and the second authentication asset; and providing the network connection to the client device through a mutable network device, the network connection defined at least in part by the first set of network policies if the applied authentication asset is the first authentication asset and defined at least in part by the second set of network policies if the applied authentication asset is the second authentication asset. The first set of network policies and the second set of network policies each comprise at least one network policy. Each network policy describes a network functionality and governs the circumstances in which the network functionality is applied to the network connection, the network functionality being at least one of a network access, a network capacity, and a network resource. The first set of network policies differs from the second set of network policies by at least one unique network policy that is found exclusively in one of the first set of network policies and the second set of network policies.

Implementations may include one or more or all of the following.

The authentication server is a RADIUS server.

The applied authentication asset is received from the client device while the client device is engaging in the authentication process.

The applied authentication asset is at least part of a username.

The method further includes receiving the username from the client device and sending an Access-Request message including the username to the authentication server.

The applied authentication asset is at least part of a field of a certificate.

The applied authentication asset is at least part of one of a common name, an organization name, and an organizational unit name from the certificate.

The applied authentication asset is received by the mutable network device from the authentication server as part of the authentication process, the applied authentication asset being a Server-Assigned Attribute.

The applied authentication asset is a Vendor-Specific Attribute.

The method further includes communicating one of the first set of network policies and the second set of network policies to the mutable network device through a plurality of Server-Assigned Attributes including at least one Vendor-Specific Attribute. The applied authentication asset is received by the authentication server as part of the authentication process. The authentication server determines if the applied authentication asset matches one of the first authentication asset and the second authentication asset. The network connection provided to the client device through the mutable network device is defined at least in part by the plurality of Server-Assigned Attributes received by the mutable network device from the authentication server, the plurality of Server-Assigned Attributes specifying at least the unique network policy.

The method further includes defining a default network policy including a network functionality that is applied to every network connection provided through the mutable network device unless preempted by another network policy. The unique network policy includes a policy exception that preempts and negates the default network policy.

The unique network policy includes a schedule and a network functionality that is available according to a schedule.

The network functionality is a network access that is only available according to the schedule.

The method further includes redirecting the client device to a captive portal in response to the client device attempting to utilize the network access at a time prohibited by the schedule. The captive portal includes a user interface through which a schedule exception can be requested.

The method further includes configuring a traffic kernel module within the mutable network device to provide the network connection to the client device upon successful completion of the authentication process, the network connection defined at least in part by the first set of network policies if the applied authentication asset is the first authentication asset and defined at least in part by the second set of network policies if the applied authentication asset is the second authentication asset.

The foregoing and other aspects, features, and advantages will be apparent to those artisans of ordinary skill in the art from the description and drawings, and from the claims.

Aspects and applications of the disclosure are described in the drawings and the description below. Unless specifically noted, it is intended that the words and phrases in the specification and the claims be given their plain, ordinary, and accustomed meaning to those of ordinary skill in the applicable arts. The inventor is fully aware that they can be their own lexicographers if desired. The inventor expressly elects, as its own lexicographer, to use only the plain and ordinary meaning of terms in the specification and claims unless clearly stated otherwise and then further, expressly set forth the "special" definition of that term and explain how it differs from the plain and ordinary meaning. Absent such clear statements of intent to apply a "special" definition, it is the inventor's intent and desire that the simple, plain and ordinary meaning to the terms be applied to the interpretation of the specification and claims.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented but have been omitted for purposes of brevity.

The inventor is also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventor is fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred implementations, but in addition, include any and all structures, materials or acts that perform the claimed function as described in alternative implementations or forms of the disclosure, or that are well known present or later-developed, equivalent structures, material or acts for performing the claimed function.

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

Finally, while this disclosure includes a number of implementations in many different forms, there is shown in the drawings and will herein be described in detail particular implementations with the understanding that the present disclosure is to be considered as an exemplification of the principles of the disclosed methods and systems and is not intended to limit the broad aspect of the disclosed concepts to the implementations illustrated.

BRIEF DESCRIPTION OF THE DRAWINGS

The disclosure will hereinafter be described in conjunction with the appended drawings, where like designations denote like elements, and.

DETAILED DESCRIPTION

Contemplated herein is a system, method, and device for modifying the functionality of a wireless network based on the passphrase provided by a client device during authentication. Rather than establishing a separate network with a unique SSID for each set of functionalities needed, or defining network permissions on a device-by-device basis, the wireless network established and managed using the system, method, and device contemplated herein (hereinafter the "mutable network device" or "mutable network system") can provide different sets of functionalities behind a single SSID; which functionalities are provided to a client device depends upon the passphrase it uses to authenticate.

Most wireless networks use a unique passphrase for every individual SSID. The system, device, and method contemplated herein provides specific and sometimes unique functionality tied to each passphrase and encourages the reuse of individual SSIDs by overloading many functions onto a single SSID, according to various implementations. Rather than requiring the choice between multiple networks or the tedious definition of per-device permissions, the contemplated system allows different users to have different types of access by simply accessing a single network using a provided passphrase. Any device accessing the provided network with that passphrase will receive that set of functionalities, according to various implementations.

Furthermore, the system, device, and method contemplated herein may be adapted for various scales, and utilizing various networking hardware, ranging from the enterprise-level environment of a campus-wide network serving an entire college to the consumer-level device(s) providing a wireless network in the home of a single family. This is advantageous over conventional authentication-based systems and methods for managing a wireless network, which have been confined to near featureless consumer solutions or expensive commercial hardware and complex software that is well beyond the means and skill level of the average consumer. The contemplated system, device, and method provides a flexible networking environment able to provide various functionalities that is inexpensive and easy to configure and reconfigure, according to various implementations.

In the following discussion, the contemplated system, device, and method will be discussed in the context of various exemplary use cases and environments. However, it should be recognized that the systems, devices, and methods contemplated herein may be adapted for use with any wireless networking environment, application, or use case, and is not intended to be limited to the specific examples provided below. Furthermore, while some examples provided will speak of specific protocols, those skilled in the art will recognize that the contemplated systems and methods may be adapted for other networking protocols, including networking protocols yet to be developed.

Figure 1:
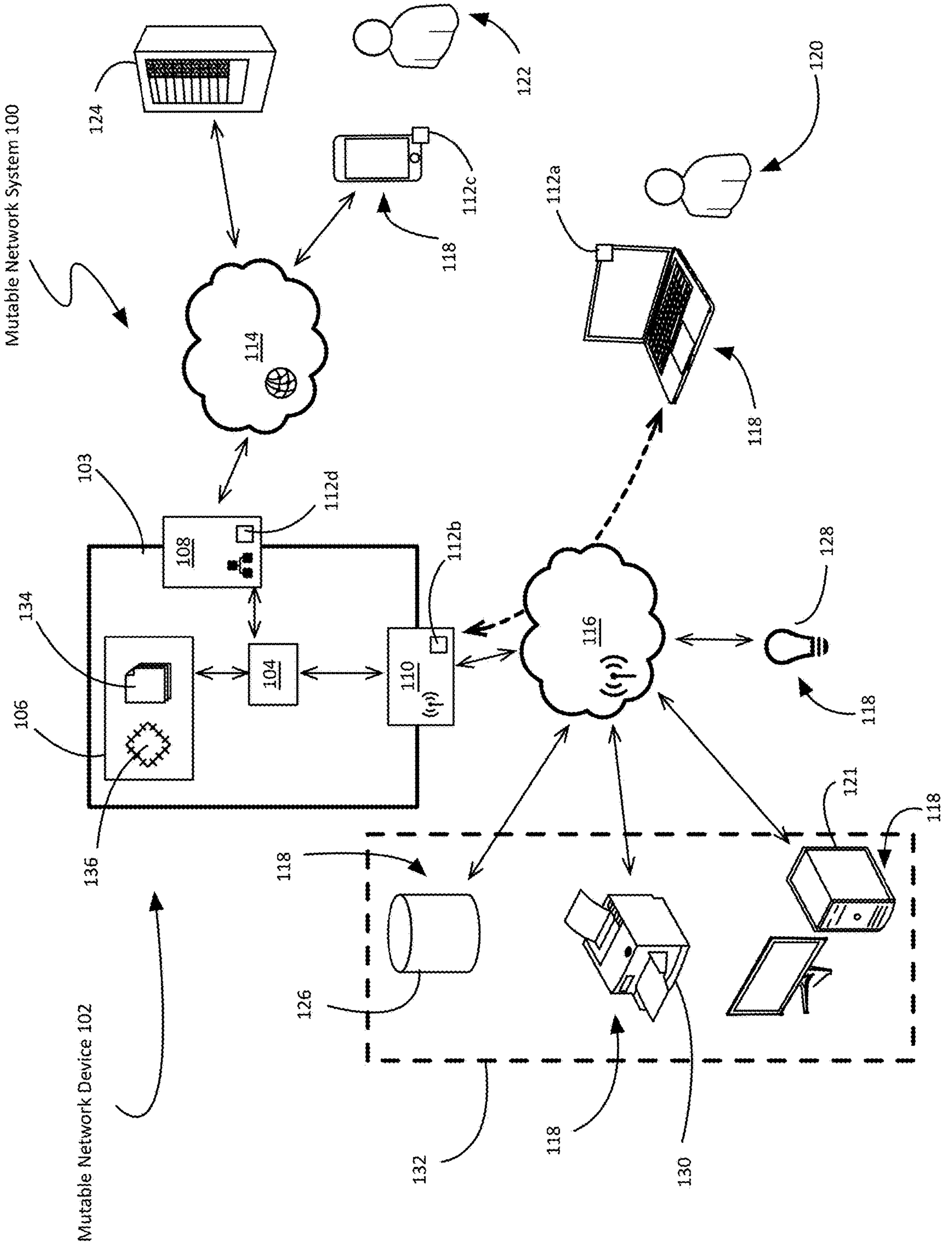
FIG. 1 is a schematic network view of a mutable network system.

FIG. 1 is a schematic network view of a non-limiting example of a mutable network system 100. The contemplated mutable network system 100 comprises at least one mutable network device 102 that is configured to modify the functionality of the wireless network 116 for a client device 118 in response to the passphrase used to authenticate and join the client device 118 to that wireless network 116. According to various implementations, the mutable network system 100 comprises at least one access point 103 that is used to establish a wireless network 116. The mutable network system 100 also comprises at least one mutable network device 102 that modifies the functionality of the wireless network 116 for a client device 118 based on the passphrase used.

In some implementations, including the non-limiting example shown in FIG. 1, the mutable network device 102 may itself be an access point 103, communicatively coupled to a wired network 114 (e.g., WAN, the Internet, etc.) through a wired network interface 108. In the context of the present description and the claims that follow, an access point 103 is any device that allows wireless devices to connect to a wired network using Wi-Fi or a similar standard. It is important to note that, for the purposes of this disclosure, an access point 103 does not have to have the singular purpose of connecting wireless devices to a wired network 114, but may also fill other roles including, but not limited to, modem (e.g., cable modem, fiber optic modem, etc.), router, switch, firewall, or any other network appliance known in the art.

In other implementations, the mutable network device 102 may be a separate device that is communicatively coupled to the at least one access point 103 of the system 100, as well as to the wired network 114. In these implementations, the mutable network device 102 and the at least one access point 103 each comprise a processor and a memory that are configured such that the mutable network device 102 may transmit and/or configure a traffic kernel module 136 and cause it to be loaded into the kernel of each access point 103. Again, in some implementations, the separate (i.e., not an access point 103) mutable network device 102 may also serve other roles within the network or use environment including, but not limited to, modem (e.g., cable modem, fiber optic modem, etc.), router, switch, NAS, firewall, or any other network appliance known in the art.

In still other implementations, the contemplated method may be implemented using a conventional, general-purpose computer 121, instead of using a network appliance or a single purpose network device. Examples include desktop computers, laptops, servers, and the like. In some of these implementations, the computer 121 may comprise software configured to instruct access points 103 to load or reconfigure a traffic kernel module 136 to perform the method to be discussed below.

In some implementations, the mutable network device 102 may be a simple access point 103, with standard hardware common to conventional access point devices. In other implementations, the mutable network device 102 may also be implemented in specialized hardware that comprises elements providing specific capabilities. For example, in some implementations, the mutable network device 102 may comprise a chipset providing proprietary features such as hardware VLAN routing and hardware handling for VLAN-specific WIFI GTKs (Group Temporal Key) used to decrypt multicast and broadcast traffic.

According to various implementations, the wireless network 116 is established by the wireless network interface 110 of the at least one access point 103, whether it/they be mutable network devices 102, or otherwise. In some implementations of the contemplated system 100, the mutable network device 102 may stand between the wired network 114 and the wireless network 116 (e.g., it is an access point 103, the access point 103 is connected to the wired network 114 through the mutable network device 102, etc.). In other implementations, the mutable network device 102 may be communicatively coupled to the wired network 114, and is also communicatively coupled to one or more access points 103 through the wired network interface 108 of the mutable network device 102, but it does not stand between the access points 103 and the wired network 114 (e.g., the access point 103 and the mutable network device 102 are connected to the same router or switch, etc.).

While much of the discussion of use cases provided below is in the context of consumer-level or very basic commercial-level environments (e.g., a home, a small shop, etc.), the contemplated system 100, device 102, and method may also be implemented in much larger venues using more sophisticated hardware, including but not limited to stadiums and other public venues. The non-limiting example of a mutable network system 100 shown in FIG. 1 is a very simple system comprising a single access point 103. Other implementations of the mutable network system 100 may comprise multiple access points 103 and may also include additional network appliances to provide network functionality to a large number of devices over a large physical space, such as a stadium or a campus.

Advantageous over conventional management solutions, the contemplated method may be implemented within a range of hardware form-factors (e.g., different antenna configurations to enable desired RF propagation for a particular application, etc.), rather than being limited to a particular class of hardware, such as expensive enterprise-class hardware that is far outside the budget and needs of smaller entities. Advantageously, the contemplated system, device, and method will provide enterprise-level network management features in a manner that is both inexpensive and simplified enough to be used in consumer-level network appliances such as an access point 103 for a home network.

As shown in FIG. 1, a number of client device 118 are communicatively coupled to the access point 103 (which is also the mutable network device 102 in this non-limiting example) through a wireless network 116. In the context of the present description and the claims that follow, a client device 118 is any device that would need to provide a passphrase to connect to the wireless network 116. Examples include general purpose computers 121 (e.g., mobile devices, desktop computers, laptops, etc.), storage devices 126 (e.g., network accessible storage or NAS, file server, etc.), Internet of Things (IoT) devices 128 (e.g., smart home devices, sensors, wearables, etc.), printers 130, scanners, media servers, and the like.

Some client devices 118 may serve as an interface for a user 120, such as a laptop. Other client devices 118 may serve as a resource that is accessible through the wireless network 116 (e.g., printer 130, storage device 126, etc.) and may be utilized through the wireless network 116 using an authenticated client device 118. As shown, client devices 118 within the wireless network 116 may belong to a VLAN 132, in some implementations. Functionalities made available through the wireless network 116 such as access and use of resources, VLANs, and the like, are able to be managed by the mutable network device 102 based on the passphrase a client device 118 uses to authenticate with the wireless network 116. Specific examples of this management using network policies 134 will be discussed below.

As shown in FIG. 1, a client device 118 may be used by a specific user 120. For the most part, the contemplated system, method, and device is less concerned with the identity of the user 120 operating a client device 118 and is instead focused on the passphrase used to authenticate the client device 118 to the wireless network 116. According to various implementations, a passphrase may be used by more than one client device 118 at the same time within the contemplated system 100. In other words, two different users 120 could be using the same passphrase with two different client devices 118 on the same wireless network 116 simultaneously. However, there are instances when the identity and/or actions of the user 120 is taken into account, as will be discussed below in the context of FIG. 2.

The mutable network device 102 is able to be configured by an administrator 122. In some implementations, the administrator 122 may connect to the mutable network device 102 using a client device 118 connected to the wireless network 116. In other implementations, the administrator 122 may interact with the mutable network device 102 through a connection with the wired network 114, or even remotely over the Internet.

As shown, in some implementations, the mutable network device 102 comprises a processor 104 and a memory 106, with the processor 104 communicatively coupled to a wired network interface 108 (i.e., a network interface controller or NIC for a wired network). The wired network interface 108 is communicatively coupled to a wired network 114. In some implementations, including the non-limiting example shown in FIG. 1 where the mutable network device 102 is also an access point 103, the processor 104 of the mutable network device 102 may also be communicatively coupled to a wireless network interface 110 (i.e. a NIC for a wireless network) that is in turn communicatively coupled to a wireless network 116. These network interfaces, and all of the client devices 118, have a unique identifier 112 (e.g., MAC address, BSSID, etc.) that is specific to that particular device or interface, as is known in the art.

In some implementations, and in many conventional devices, the BSSID (i.e., Basic Service Set Identifier) may be based upon, or otherwise related to, a value established at the time of manufacture, such as the hardware MAC address for the wireless network interface 110. In other implementations, the BSSID may be a unique identifier by which a network/band/radio may be specifically known and distinguished from other such entities but may be generated or modified after the device was manufactured. Such an arrangement gives the contemplated device greater flexibility when it comes to the creation and deletion of SSIDs during operation. Those skilled in the art will recognize that while the origin of the identifier may vary from device to device, or from protocol to protocol, the concept of a unique identifier for a network interface plays a part in authentication and messaging.

The memory 106 of the mutable network device 102 comprises a collection of network policies 134 and a traffic kernel module 136, according to various implementations. In the context of the present description and the claims that follow, a network policy 134 defines one or more network functionalities that may be provided to a client device 118. In some implementations, a network policy 134 may also comprise a limitation that governs the context in which the defined functionality or functionalities is made available. According to various implementations, the contemplated mutable network device 102 is configured to apply, or cause an access point 103 to apply, a network policy 134 to the connection of a client device 118 to a wireless network 116 that is selected based upon the passphrase used to authenticate the client device 118 when connecting to the wireless network 116. Network policies 134 and network functionalities will be discussed in greater detail with respect to FIG. 2, below.

In the context of the present description and the claims that follow, a traffic kernel module 136 is a piece of code that can be loaded and unloaded into the kernel of the access point 103 upon demand. Kernel modules extend the functionality of the kernel without the need to reboot the system. More specifically, the traffic kernel module 136 extends the functionality of the kernel of the access point 103 such that network activity coming from a particular device (identified when authenticated to the network using a particular passphrase) can be treated in such a way that one or more network policies 134 associated with that passphrase can be applied or enforced on said network activity. The traffic kernel module 136 also facilitates the association of an identifier (e.g., assigned IP address, unique identifiers 112, etc.) of a device with the passphrase used to authenticate, such that the proper network policy 134 or policies 134 can be identified and the traffic kernel module 136 can be configured. In some implementations, this may be adapted for use with the embedded operating system of conventional access points 103. In other implementations, the traffic kernel module 136 may be utilized within a proprietary operating system, which may run on standard or non-standard access point hardware.

According to some implementations, the network connection provided to a client device 118 and defined, at least in part, by the network policy 134 or policies 134 that are associated with the provided passphrase may be provisioned and policies enforced by a traffic kernel module 136. In other implementations, the connection may be defined and the policies 134 enforced by something other than a kernel module 136. Examples include, but are not limited to, conventional traffic/filtering rules and tables, code running on the access point 103 that extends the network stack, a modified wireless driver, and the like. Furthermore, in some implementations the traffic kernel module 136 may be entirely proprietary, while in other implementations, at least a portion of the traffic kernel module may be implemented using conventional frameworks such as Netfilter.

The network policies 134 and functionalities are defined by an administrator 122 and associated with particular passphrases using a user interface, according to various implementations. The administrator user interface will be discussed further in the context of FIG. 5, below. These policies and other configurations are stored in the memory 106 of the mutable network device 102, as shown. The mutable network device 102 can then distribute to the access points 103 within the mutable network system 100 the required information, such as the traffic kernel module 136. In some implementations, including the non-limiting example shown in FIG. 1, the mutable network device 102 may also be an access point 103, and the only access point 103 in the mutable network system 100. In other implementations, the mutable network system 100 may comprise multiple access points 103 which may or may not also be mutable network devices 102. In some implementations, the traffic kernel module 136 and other information such as network policies 134 may be distributed locally to the access points 103 or other mutable network devices 102 (e.g., when one serves as the administrator interface and has receive new configurations, etc.).

In other implementations, these configurations may be defined and/or stored remotely, such as in cloud storage or some other system that will be referred to hereinafter as a server 124, which is communicatively coupled to the wired network 114, through which the one or more mutable network device 102 may be accessed to upload the configuration information.

As a specific example, in some implementations a HTTPS POST command may be sent to a cloud back-end server 124. The cloud back-end determines which access points 103 are impacted by, for example, a SSID configuration change, and creates a new configuration payload for each impacted access point 103. The cloud back-end then sends this new configuration to all impacted access points 103 via an MQTT channel. If the access points 103 are currently connected to the MQTT channel, they will receive, store in flash, and apply the new configuration immediately. If they are not connected, they will upload the hash of their most recent configuration to the cloud as they connect the next time. If that hash does not match the hash stored in the back-end database, the back-end will send the access point 103 the updated configuration at that point.

Conventional enterprise access points tend to be heavily reliant on a controller device; if the controller goes offline, some core functionalities such as authentication, scheduling, filtering, hotspot provisioning, etc. can become unavailable. Advantageous over conventional enterprise systems, the mutable network system 100 contemplated herein comprises one or more mutable network devices 102 that are able to receive instructions (e.g., instructions provided to a configuration agent running on the device 102, etc.) through an interface provided by the device 102 (e.g., a web interface for configuring policies 134, etc.) or received from a cloud platform. Once received, the mutable network devices 102 are able to provide all network functionality autonomously, without reliance on a controller or other device to execute the instructions.

As a specific example, in one implementation the mutable network devices 102 may maintain a constant connection to a cloud platform (e.g., server 124). Upon receipt of any changes to the policies at the cloud server, all mutable network devices 102 are updated immediately, in real-time or near real-time, from the cloud platform. In another implementation, the remote server 124 providing a cloud platform that provides the instructions may be replaced by a device that is local to the mutable network devices 102; however, this hardware controller, though installed on-site like a conventional controller, simply gives the mutable network devices 102 the latest set of instructions, which they will continue to implement even if the controller device goes offline. This is one way the contemplated system, device, and method offer specific improvements to networking technology, in addition to providing enterprise-level features in simple to use consumer level devices.

Figure 2:
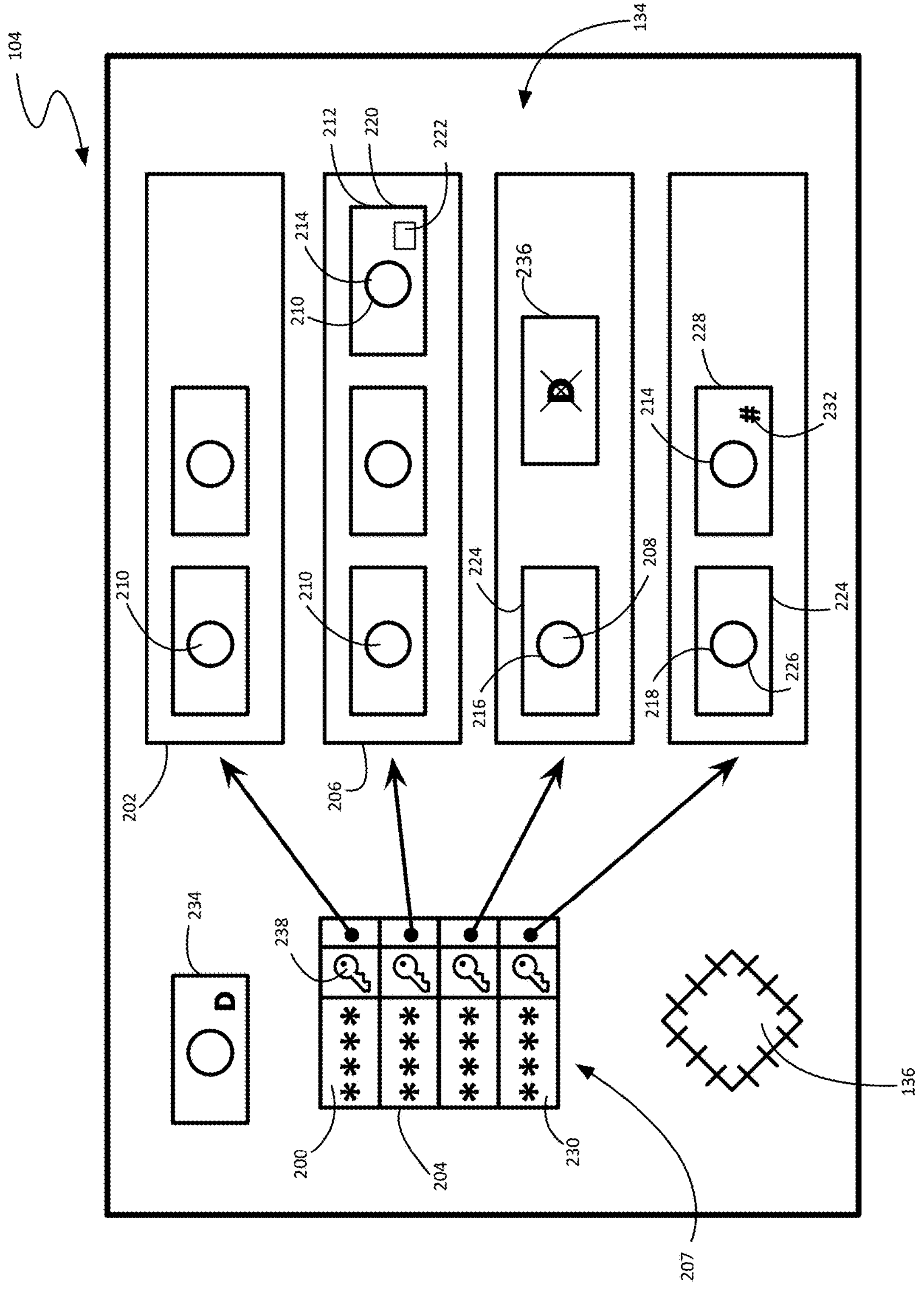
FIG. 2 is a schematic view of the memory of a mutable network device.

FIG. 2 is a schematic view of a non-limiting example of the memory of the mutable network device 102 of FIG. 1. Specifically, FIG. 2 shows schematic representations of non-limiting examples of a plurality of passphrases (e.g., first passphrase 200, second passphrase 204, etc.) and network policies 134 (e.g., first set of network policies 202, second set of network policies 206, etc.), in addition to a traffic kernel module 136.

It should be noted that while the following discussion is done in the context of a first passphrase 200 and a second passphrase 204 and associated sets of network policies 134, this is done for illustrative purposes. In other implementations, the contemplated mutable network device 102 can manage and modify the functionality of a wireless network 116 based upon numerous unique passphrases. The discussion of first and second passphrases should not be interpreted as limiting the contemplated system 100, method, and device 102 to only two different passphrases.

As previously mentioned, a network policy 134 specifies one or more network functionalities 210 that may be provided to a client device 118. In some cases, a network policy 134 may also comprise a limitation that governs the context in which the defined functionality 210 or functionalities 210 is made available. Some network policies 134 may comprise a single network functionality 210, while others may specify multiple network functionalities 210, which may be beneficial in the case of a collection of network functionalities 210 that are typical to many of the passphrases being configured for the system 100. Those commonly shared (but not universal, as will be discussed below) could be specified within a single network policy 134 to speed up the definition of new passphrases with this shared functionality.

Some network policies 134 may also comprise a condition, according to various implementations. Evaluation of the condition or conditional statement is used to determine how and/or when the accompanying network functionality 210 will be applied or made available. In some implementations, the conditions may be simple two state binary considerations, a yes/no question that determines whether or not to provide the accompanying functionality. In other implementations, the condition may be more complex. For example, in one implementation, the condition may be multi-state, with functionality specified for each state. In another implementation, the condition may be an evaluation whose result lies within a range (e.g., what time is it, how many people are using the wireless network, etc.). In some implementations, a network policy 134 may have a condition whose determination may be performed using information that exists within the mutable network system 100. In other implementations, the condition may require information outside of the mutable network system 100 (e.g., whether the user 120 has commented on social media, etc.).

FIG. 2 shows a schematic view of various network policies 134. In practice, a network policy 134 may exist as a file, or part of a file, within the memory 106 of the mutable network device 102, according to some implementations. In other implementations, the network policies 134 may be stored as objects or records in a database. In still other implementations, the network policies 134 may be stored in any other form known in the art that makes them accessible to the mutable network device 102.

As previously discussed, each network policy 134 describes at least one network functionality 210 and governs the circumstances in which it/they are applied to the network connection 306. In the context of the present description and the claims that follow, a network functionality 210 refers to a set of one or more aspects, characteristics, connectivities, capacities, privileges, resources, permissions, or other attribute(s) that can describe a wireless network, an interaction with a wireless network, and/or an interaction within a wireless network.

According to various implementations, network functionalities 210 may be categorized as being at least one of a network access 214, a network capacity 216, and/or a network resource 218. Those skilled in the art will recognize that there may be network functionalities that could be described using more than one of an access 214, a capacity 216, and a resource 218.

In the context of the present description and the claims that follow, a network access 214 is the ability, or lack thereof, to communicate with and/or receive communications from a device or a network. Examples of a network access 214 include, but are not limited to, being able to access external networks and/or the Internet, able to access internal networks, able to interact with IoT devices, a filter or lack thereof, able to access other devices, able to communicate using a particular port, exposed to specific VLAN interfaces, and the like.

In the context of the present description and the claims that follow, a network capacity 216 describes the degree to which a network access 214 may be utilized, or the nature of the network access itself. Examples of a network capacity 216 include, but are not limited to, adapted for a large number of devices, adapted for a small number of devices, bandwidth 208, latency, jitter, optimized for speed, optimized for latency, and the like.

In the context of the present description and the claims that follow, a network resource 218 describes what falls within the boundaries of a network access 214 and how it may be utilized, either in sending or receiving. Examples of a network resource 218 include, but are not limited to, a data limit 226 defined for a set period of time, Quality of service priorities, a firewall configuration, ability to use peripheral devices such as printers, services, and the like.

While the following discussion will describe specific, non-limiting examples of network functionalities 210, it should be noted that other implementations of the contemplated system 100, device 102, and method may manage additional, fewer, or altogether different network functionalities 210. The contemplated mutable network device 102 facilitates the definition and provisioning of different functionalities 210 and is not limited in which functionalities 210 can be provided and managed, according to various implementations.

It is important to note the distinction between a network policy 134 and a network functionality 210. A network functionality 210 describes, in part, a wireless network 116, an interaction with a wireless network 116, and/or an interaction within a wireless network 116, when it is applied to said wireless network 116. A network policy 134 defines at least part of a network connection with or through a wireless network 116 by specifying or describing one or more network functionalities 210 to be applied to said wireless network 116. In some cases, a network policy 134 also defines and governs the conditions or circumstances of when or how the specified one or more network functionalities 210 is to be applied. Thus, some network policies 134 may simply specify one or more network functionalities 210, and other network policies 134 may specify one or more network functionalities 210 along with defining the conditions for application of said functionalities. Both types of network policy 134 are discussed below.

The mutable network device 102 is configured to define, or receive administrator 122 input to define, a first set of network policies 202 associated with a first passphrase 200 for the wireless network 116, and a second set of network policies 206 associated with a second passphrase 204 for the wireless network 116, with the second passphrase 204 being different from the first passphrase 200, according to various implementations. While this disclosure will focus on these two passphrases and their associated sets of network policies 134 in order to better illustrate the advantageous ability of the contemplated mutable network system 100 and device 102 to provide different functionality to different client devices 118 based upon the passphrase used, other implementations may utilize more than two unique passphrases.

According to various implementations, a first set of network policies 202 is associated with a first passphrase 200 within the mutable network device 102. In some implementations, this association may be accomplished through some form of lookup table 207, listing different passphrases along with the associated set of network policies, either by reference or by value. In other implementations, a passphrase may be associated with a set of network policies using any other method known in the art.

In some implementations, the mutable network device 102 is used in conjunction with a wireless network 116 that uses a security protocol that comprises the passphrase never actually being directly transmitted over the air (e.g., WPA, WPA2, etc.). In such cases, the association between a passphrase and a set of network policies may also include an association with a cryptographic key 238 that is generated based, at least in part, upon the passphrase. Doing this would reduce the number of operations needed to determine which passphrase is being used for each time a new connection is authenticated to the wireless network 116. As a specific example, in an implementation using the WPA2 standard, A Pairwise Master Key (PMK) is an intermediate key that is generated using the SSID of the wireless network 116 and the passphrase or Pre-Shared Key (PSK) as part of the four-way handshake process for authentication. While the PMK is not transmitted, it is used in calculations that ultimately generate a Message Integrity Code (MIC) that is transmitted. Storing the PMK for each passphrase means the PBKDF2 algorithm only needs to be applied once to generate the PMK, not every time there is a new authentication. The four-way handshake will be discussed in greater detail with respect to FIG. 4, below.

In some implementations, in addition to being associated with a passphrase, a set of network policies 134 may also be associated with, or require, a particular unique identifier 112. In some implementations, a set of network policies 134 may require the use of a particular passphrase and that the passphrase is being used to authenticate a client device 118 having a particular unique identifier 112. In other implementations, the interface and mechanisms provided for an administrator 122 to define a set of network policies 134 may also allow them to define policies that are tied to specific unique identifiers 112, as is done in conventional network management solutions known in the art.

While the passphrases being associated with different sets of network policies 134 must obviously be unique, the sets of network policies 134 do not. The association of two different passphrases with the same set of network policies 134 is not precluded, according to various implementations. However, one of the novelties that makes the contemplated mutable network system 100, device 102, and method advantageous over conventional wireless network hardware and methods is the ability to provide different functionality to different client devices 118 based entirely on what passphrase they use to authenticate to the network. Thus, it is worth noting that in the non-limiting example of a first set of network policies 202 and a second set of network policies 206 shown in FIG. 2, there is a unique network policy 212 that is part of the second set, but not in the first set. In other examples, the unique network policy 212 could be a network policy 134 that is present in both sets but is configured differently. A network policy 134 can be said to be found exclusively in one set by virtue of the configuration details, not just by the type of policy.

FIG. 2 shows a schematic representation of a number of examples of network policies 134, arranged in sets. The following discussion of these examples is not meant to be exhaustive. According to various implementations, a network policy 134 may be defined to specify any network functionality 210, with or without conditions or constraints.

A scheduled network policy 220 is a policy that conditions the periodic application of one or more network functionalities 210 on a schedule 222 that is defined within the policy 220. In some implementations, including the non-limiting example shown in FIG. 2, a scheduled network policy 220 may specify a network access 214. In other implementations, it could be a network filter, as will be discussed below. In still other implementations, the scheduled network policy 220 may be used to schedule the application of any network functionality 210, including but not limited to the network functionalities 210 represented schematically in FIG. 2 and/or discussed herein.

In some implementations, a scheduled network policy 220 may comprise a schedule 222 and one or more network functionalities 210 that are only applied when permitted by the schedule 222 (i.e., the schedule 222 specifies states of 'on' or 'off' for the specified network functionalities 210). In other implementations, the schedule 222 may instead describe a change in which network functionalities 210 are being applied. For example, it may be configured such that a first functionality is applied from 12 am to 8 am, a second functionality applied from 8:01 am to 9 pm, and a third functionality from 9:01 pm to 11:59 pm, every day. According to various implementations, the schedule 222 may repeat on a daily basis, a weekly basis, or a monthly basis. In other implementations, the schedule 222 may not be repeating, and instead specify a window of time in which a network functionality 210 such as access to a high-speed internet connection is available, after which the connection is limited to lower speeds.

As a specific example, in one implementation, a family may configure a passphrase for the kids to use on their various devices. The passphrase may be associated with a scheduled network policy 220 that will only allow access to the Internet during a particular window of time. At the same time, the parents may use the same wireless network 116, having the same SSID, but with a passphrase or passphrases that are not associated with that network policy 134. The scheduled network policy 220 and its application to this particular use case will be discussed in greater detail with respect to FIGS. 6-8, below.

According to various implementations, the scheduled policy 220, along with other policies discussed herein, is implemented and enforced by a traffic kernel module 136, as discussed above. In some implementations, the traffic kernel module 136 interacts with various other entities (not shown) defined in the memory 106 and executed on the processor 104 of the mutable network device 102, including an authenticator (e.g., the process which handles the four way handshake discussed below, the entity that can determine which passcode is being used by a client device 118, etc.), a scheduler, and a configuration agent (e.g., the interface through which policies 134 are defined and distilled into a format that can be implemented by the traffic kernel module 136, the authenticator, and the scheduler, etc.). The scheduler will tell the kernel module 136 when to enforce certain policies 134, such as when to turn on and off network access. As will be discussed below, in some implementations turning off access means redirecting to the captive portal that indicates the network is scheduled off. In some implementations, there may also be a web server running on each access point 103 which gets configured by the configuration agent. Thus, if the client device 118 is redirected to the web server's captive portal and enters a correct password in the web UI, it will allow access to the network for a configured period of time (default 4 hours), according to various implementations.

In the context of the present description and the claims that follow, a population policy 228 is a network policy 134 comprising a network access 214 and a population limit 232. The population policy 228 constrains the number of client devices 118 authenticated through use of a specific passphrase 230 and permitted to concurrently use the network access 214 to be, at most, equal to the population limit 232, according to various implementations. As a specific example, in one implementation a hotel or resort may issue a different WiFi passphrase to each guest, but the passphrase can only be used to authenticate one or two devices at any given time, to prevent abuse of the wireless network.

In the context of the present description and the claims that follow, a default network policy 234 is a network policy 134 that specifies one or more network functionalities 210 that are applied to every network connection associated with the mutable network device 102, unless preempted by another network policy 134. In other words, a default network policy 234 could be thought of as being automatically added to every set of passphrases associated with a passcode by the mutable network device 102. According to various implementations, any network policy 134 or set of network policies may also be specified as the default network policy 234, to be automatically applied as though it is associated with every passphrase. It should be noted that being a default network policy 234 does not automatically mean the conditional nature of some network policies 134 is changed. Being a default network policy 234 only means it is considered to be associated with every passphrase, and any condition defined as part of said policy will be evaluated as it would be if the policy had been explicitly added to a set of policies associated with a passphrase.

Continuing with the previous specific example of the resort, the population policy 228 could be declared a default network policy 234, such that it if automatically associated with any new passphrases created within the mutable network system 100. The ability to define one or more default network policies 234 within the mutable network system 100 is particularly advantageous in use cases where a number of passphrases are in use, or are frequently created for temporary use. Another example may be the automatic generation of a unique Wi-Fi passphrase at the bottom of each receipt at a coffee shop, limiting the use to customers and also automatically applying the set of network policies 134 desired for the customers to have.

As previously stated, the default network policy 234 is applied to every client device 118, independent of what passphrase was used to authenticate, unless it is preempted by another network policy 134. In some implementations, network policies 134 may have an inherent priority, such that a default network policy 234 will have a lower priority than a policy explicitly associated with a passphrase, if they are of the same type or if there is functional overlap. In such implementations, preemption of a default network policy 234 that is a scheduled network policy 220 limiting access to a storage device 126 to business hours would be accomplished by either a scheduled network policy 220 limiting that same access to a different schedule, or a network policy 134 defining a network access functionality 214 granting access to the storage device 126.

In other implementations, a default network policy 234) may be preempted by the use of a policy exception 236. In the context of the present description and the claims that follow, a policy exception 236 is a network policy 134 that preempts and negates the default network policy 234. In some implementations, associating a policy exception 236 with a passphrase effectively removes all default network policies 234 from the set of policies associated with that passphrase. In other implementations, a policy exception 236 may indicate specific policies that are not to be applied as a default network policy 234 to any passphrases associated with said policy exception 236, allowing some defaults to apply and others not. As an option, in some implementations, a policy exception 236 may also be associated with, and automatically applied to, a client device 118 having a particular unique identifier 112 (e.g., MAC address, etc.).

In the context of the present description and the claims that follow, a usage policy 224 is a network policy 134 that constrains some aspect of how the client device 118 is making use of the wired network 114. According to various implementations, the usage policy 224 may be constraining a network resource 218 (e.g. a data limit 226 over a period of time, etc.) and/or a network capacity 216 (e.g., a bandwidth 208, a throughput, upload rate, download rate, etc.). In some implementations, the usage policy 224 may be defined such that the functionality (i.e., network capacity 216 and/or network resource 218) is made available until the condition is satisfied, after which the functionality is removed.

In other implementations, the usage policy 224 may define functionality or functionalities for both before the condition is satisfied and after the condition is satisfied. As a specific example, in one implementation, a passphrase may be associated with a usage policy 224 that permits a client device 118 authenticated with said passphrase a set data limit each day at unlimited speeds (by policy, not physics). Any additional data beyond that limit (i.e., activity after the condition of "amount of data transferred" has been satisfied) would be limited to 20 Mbps for the rest of that day. This example also illustrates how there is overlap between network functionality types, as well as between functionality and constraint. Here, the data limit was the constraint that governed the application of a network capacity 216 (i.e., bandwidth 208) functionality through the usage policy 224. Elsewhere, a data limit 226 may be seen as a network resource 218, being a limited amount of data that can be transferred.

One network policy 134 not shown in FIG. 2 is a network filtering policy, which applies a filter on the network connection of the client device authenticated with an associated passphrase. According to various implementations, the filter may be at least one of a content-based filter and an application-based filter. As a specific, non-limiting example, a content-based filter may be appealing to parents seeking to block inappropriate web traffic from the passphrases used to connect their children's' devices to the home wireless network 116. In that same context, an application-based filter could be used in a scheduled network policy 220 such that certain online games are blocked within the home network during times set aside for schoolwork or after bedtime.

Another network policy 134 not represented in FIG. 2 is a dynamic network policy. Like other network policies 134, a dynamic network policy is a policy that specifies one or more network functionalities 210 a makes their application conditioned on the satisfaction of a defined set of circumstances. However, a dynamic network policy is unique in that the conditions used to decide if or how network functionalities 210 are to be applied is based, at least in part, on something external to the wireless network 116. According to various implementations, the dynamic network policy governs the application of specified network functionalities 210 based upon information received from outside the mutable network system 100. The ability to condition network functionality on events outside the mutable network system 100 makes it easier to integrate the mutable network system 100 and device 102 into existing setups, or to take advantage of new technologies.

According to various implementations, a dynamic network policy may be based upon an action of a user 120 that is associated with the client device 118 authenticating with the passphrase associated with the dynamic network policy. In some implementations, this action may be an interaction with another system, such as another authentication system or a social media site. The dynamic network policy typically interacts with a device such as a server 124 that is outside the mutable network system 100 to obtain the information needed to determine whether the condition has been satisfied, according to various implementations.

In some implementations, the one or more network functionalities 210 may only be applied until the condition is satisfied, while in other implementations, they may only be applied after the condition is satisfied. In still other implementations, the dynamic network policy may be specified such that some network functionalities 210 are applied before the condition is satisfied, and other network functionalities 210 are applied after the condition is satisfied.

In some implementations, a dynamic network policy may be limited to the consideration of a single condition, allowing the dynamic network policy to condition the application of specified network functionalities 210 across two states (e.g., true or false, on or off, etc.). In other implementations, a dynamic network policy may specify multiple conditions, giving the dynamic network policy three or more states to which one or more specified network functionalities 210 may be tied.

In an exemplary application, a client device 118 using a passphrase associated with a dynamic network policy may have a limited bandwidth 208 for their network connection until the user 120 authenticates themself through a portal or within a social media service, after which a higher bandwidth 208 is applied to the connection. As a specific example, this capability could be used in a coffee shop or small cafe, where it could be integrated with a customer loyalty program (e.g., create an account and provide your email through a captive portal for faster Wi-Fi, etc.) or a promotion that rewards customers for actions such as posting on social media with the business tagged. The capability to do such things would not be possible using conventional hardware and techniques that would be practical for a small business. The contemplated system 100, device 102, and method make it possible to provide such features on equipment that is accessible to consumers and small commercial buyers.

Figure 3:
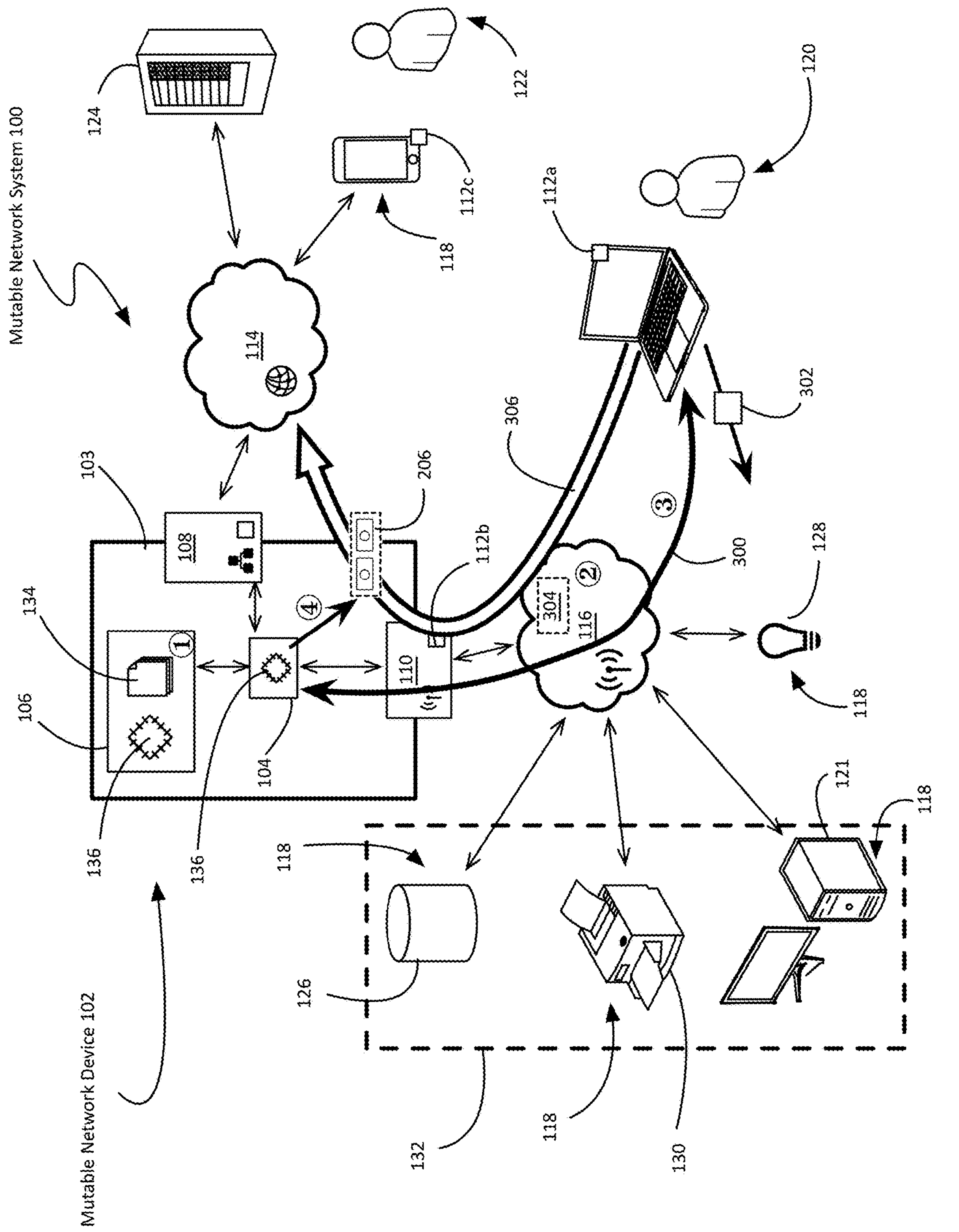
FIG. 3 is a schematic network view showing a process flow of the contemplated method within a mutable network system.

FIG. 3 is a network view showing a process flow for a non-limiting example of the contemplated method for modifying functionality within a wireless network 116 based on a provided passphrase. First, a first set of network policies 202 and a second set of network policies 206 are defined and associated with a first passphrase 200 and a second passphrase 204, respectively. See circle '1'. According to various implementations, the mutable network device 102 may provide an interface to a configuration agent (e.g., a web page served over the network by a web server running on the mutable network device 102, a network interface for an app or an externally hosted configuration interface, etc.) through which the administrator 122 is able to define sets of network policies 134, and associate them with unique passphrases. The configuration agent then distills the defined policies and the associated passcodes into an appropriate format (e.g. text file, JSON files, etc.) that other processes such as the traffic kernel module 136, the authenticator, and the scheduler can read and execute.

Next, a client device 118 is authenticated with the wireless network 116 through an authentication process 300. In this non-limiting example of the contemplated method being implemented with a mutable network system 100, the mutable network device 102 is also an access point 103, as shown in FIG. 3. In this specific implementation, the mutable network device 102 is the only access point 103, meaning the entire wireless network 116 is provided solely by the wireless network interface 110 of the mutable network device 102. This is expected to be typical in implementations targeted at basic consumer use, such as in a single-family home. In other implementations, the mutable network device 102 and the access point 103 or access points 103 may be separate devices, as previously discussed.

In this implementation, where the mutable network device 102 is also the access point 103, a Service Set Identifier (SSID) 304 for the wireless network 116 is broadcast through the wireless network interface 110 of the mutable network device 102. See circle '2'. Advantageous over conventional systems, the mutable network system 100 is able to provide a variety of network functionalities through a single SSID, something that would require the use of multiple SSIDs in conventional wireless network solutions.

The SSID 304 is shown as part of the wireless network 116 in FIG. 3. In some ways, the SSID 304 and the wireless network 116 are synonymous. The SSID 304 is the identifier presented to client devices 118 that may be looking to join a network; it is the public face of the wireless network 116, from the point of view of a client device 118. Within some contexts, the SSID and the concept of a wireless network are interchangeable.

According to various implementations, the authentication process 300 is initiated in response to the mutable network device 102 receiving a connection request 302 from the client device 118 that is directed to the SSID 304. The mutable network device 102 is designed to engage in an authentication process 300 with the client device 118, either directly as the access point 103 or indirectly through a separate access point 103, to secure a network connection 306 between the client device 118 and the wireless network 116, while at the same time determining which of the two or more passphrases are being used by the client device 118 (again, this discussion is in the limited context of a two passphrase use case, for simplicity). See circle '3'.

In some implementations, the passphrase used may be determined directly (e.g., the passphrase is transmitted over the air). In other implementations, the identity of the passphrase may be determined through cryptographic keys 238 shared during the authentication process 300. As a specific example, in some implementations, the authentication process 300 may be a four-way handshake between the access point 103 (here, the mutable network device 102) and the client device 118. The four-way handshake will be discussed in greater detail with respect to FIG. 4.

In other implementations, a different authentication process 300 may be utilized. Those skilled in the art will recognize that while the nature of what is being shared over the air may differ between security protocols, both known and not yet developed, the cryptographic key(s) 238 that are transmitted so the passphrase can be authenticated may also be used by the mutable network device 102 to determine which set of network policies 134 should be applied over the resulting network connection 306.

Finally, once the mutable network device 102 has determine what passphrase was used in the authentication process 300, it configures a traffic kernel module 136 to be loaded into the kernel of the access point 103 (here, the mutable network device 102) that will provide the network connection 306 to the client device 118 upon successful completion of the authentication process 300. See circle '4'. As a result of the traffic kernel module 136, the network connection 306 will be defined, at least in part, by the first set of network policies 202 if the provided passphrase 402 is the first passphrase 200, or defined at least in part by the second set of network policies 206 if the provided passphrase 402 is the second passphrase 204, in this simple two passphrase exemplary use case.

Figure 4:
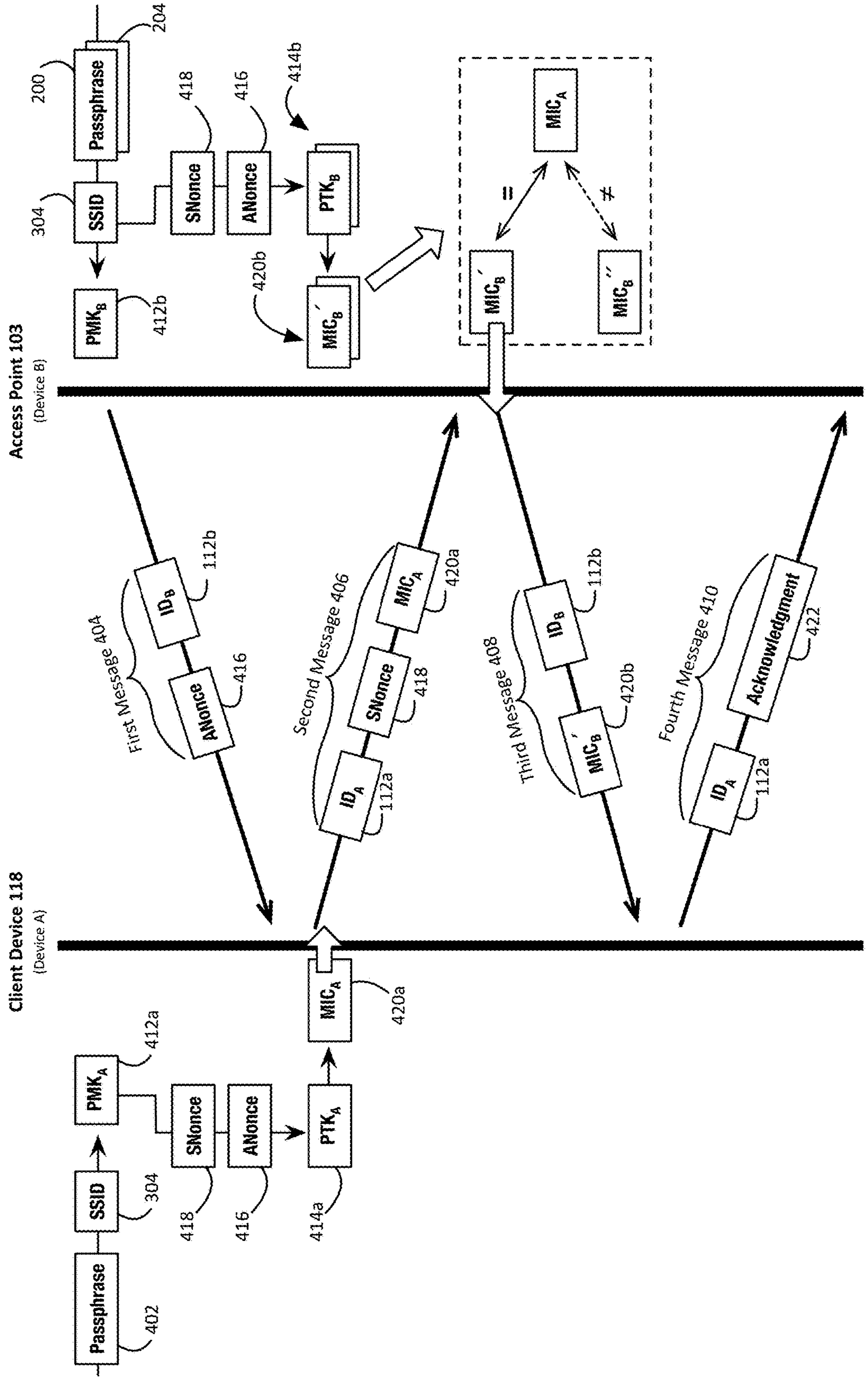
FIG. 4 is sequence diagram of an authentication process.

FIG. 4 is sequence diagram of a non-limiting example of an authentication process 300. Specifically, FIG. 4 shows a four-way handshake 400 between a client device 118 and a mutable network device 102 that is also an access point 103. It should be noted, however, that most of the elements of this sequence diagram attributed to the mutable network device 102 would belong to an access point 103 were it distinct from the mutable network device 102, as it is in some implementations. The aspects of the sequence diagram shown in FIG. 4 that might deviate from a traditional four-way handshake 400 (i.e., due to more than one potential valid passphrase) are surrounded by a dashed box. Furthermore, some implementations of the mutable network device 102 are built around the IEEE WPA2-PSK standard, which natively offers the ability to configure a SSID 304 with multiple passphrases. In other implementations, though, the contemplated method may be implemented with a wireless network 116 using other security standards, including standards not yet existing, so long as the client device 118 is able to authenticate with a passphrase or some other value.

The specific ways a four-way handshake 400 may be modified for use in conjunction with the mutable network system 100 will be indicated below, with the bulk of the discussion referring to the device as an access point 103. It is important to remember, though, that in some implementations the access point 103 is also a mutable network device 102.

As is known in the art, the four-way handshake 400 is an authentication process 300 for obtaining access to service(s) and connectivities provided by a wireless network 116. This handshake 400 allows the client device 118 and the access point 103 to prove to each other they are who they claim to be. In this specific, non-limiting example, the four-way handshake 400 utilizes a passphrase, also called a pre-shared key (PSK), while never broadcasting the passphrase over the air.

The four-way handshake 400 process comprises the transmission and reception of four messages between the access point 103 and the client device 118. The client device 118 and access point 103 will also be referred to as device 'a' and device 'b', respectively, mainly through the figure element numbers of elements they have in common. First, the access point 103 initiates the handshake 400 with a first message 404 comprising data needed to construct a pairwise transient key 414, or PTK. Specifically, an Authenticator Nonce 416 and the unique identifier 112*b* of the wireless network interface 110 of the access point 103 (i.e., the BSSID).

Upon receipt of the first message 404, the client device 118 has the information needed to calculate its own Pairwise Transient Key 414*a* (PTK 414*a*), using ANonce 416, a nonce-value associated with the client device 118 called the Supplicant Nonce or SNonce 418, both unique identifiers 112*a* and 112*b* (e.g., MAC addresses, BSSID, etc.), and the Pairwise Master Key 412*a* belonging to the client device 118. The Pairwise Master Key 412*a* is derived from the provided passphrase 402 being used by the client device 118 and the SSID 304 of the access point 103. The client device 118 then creates a Message Integrity Code 420*a* (MIC 420*a*), which is a cryptographic checksum calculated using the PTK 414*a* belonging to the client device 118.

The second message 406 is sent from the client device 118 back to the access point 103, SNonce 418, the unique identifier 112*a* of the client device 118 (e.g., MAC address), as well as the Message Integrity Code 420*a*. Upon receiving the SNonce 418 and the unique identifier 112*a* of the client device 118 the access point 103 constructs its own PTK 414*b*, which is then used to calculate the access point's own MIC 420*b*.

It is after the second message 406 of the four-way handshake 400 that the access point 103 is first able to determine which passphrase is being provided by the client device 118, according to various implementations. This is accomplished by comparing the received MIC 420*a* with the calculated MIC 420*b*. If they match, then both devices used the same passphrase in their respective calculations. In the case at hand, in order to determine which passphrase was used (i.e., the first passphrase 200 or the second passphrase 204), the access point 103 would need to calculate a MIC 420*b* for each passphrase, hereinafter referred to as $MIC_b'$ for the first passphrase 200 and $MIC_b''$ for the second passphrase 204.

In determining which, if any, set of network policies 134 should be applied or enacted on the network connection 306 being established via the four-way handshake 400 between the access point 103 and the client device 118, the mutable network device 102 will need to compare the passphrase used by the client device 118 (i.e., the provided passphrase 402) with the passphrases stored in the memory 106. In implementations where the provided passphrase 402 is broadcast over the air, or where the actual provided passphrase 402 is discernable by the access point 103, this comparison may be made between the provided passphrase 402 and the passphrases associated with various sets of network policies 134. In other implementations, including the non-limiting example represented by FIG. 4, the provided passphrase 402 is not broadcast nor directly discernable. Instead, a cryptographic value (i.e., MIC 420*a*) is provided by the client device 118 for comparison. Thus, that same cryptographic value needs to be calculated for every passphrase stored in the memory 106 and associated with a set of network policies 134, until a match is found.

In some implementations, that calculation may be performed starting from a plaintext passphrase each time a four-way handshake 400 is performed. In other implementations, including the non-limiting example shown in FIG. 4, parts of the calculation that are reusable may be performed once and then stored along with the passphrases and sets of network policies 134 such that they are associated with their respective policies and passphrase. As a specific example, as shown in FIG. 4, the PMK 412 is part of the calculation that ultimately yields the PTK 414 which can be used to calculate the MIC 420 used for identifying the associated set of network policies 134. The PMK 412 is calculated using the passphrase and the SSID 304 of the wireless network 116, and is able to be reused for each handshake process. According to some implementations, the PMK 412 (i.e., a cryptographic key 238) for each passphrase may also be stored in the memory 106, and also associated with a passphrase and a set of network policies 134. If an aspect of that calculation were to change, these reused values may be recalculated and stored again for future use. It should be noted that while this non-limiting example of a procedure for determining which passphrase is being provided to the access point 103 is specific to the WPA2 standard, other standards (e.g., WPA3, etc.) may be adapted to provide similar results, according to various implementations.

After the second message 406 in the four-way handshake 400 is verified by a matching MIC 420, the client's eventual connection to the access point 103 will be configured to have the predefined network policies 134 in place. This is not part of the standard handshake process, but is instead triggered and enabled by said handshake, according to various implementations.

As previously discussed, the network functionalities 210 that the access point 103 may be configured, through network policies 134, to provide in response to a particular passphrase include, but are not limited to, VLAN assignment/access, network type, permission to bypass a schedule or captive portal, and the like. Some of this configuration of the access point 103 may be done using conventional methods, according to various implementations. As a specific example, in one implementation, the provisioning of desired VLAN traffic may be treated in the same way a static VLAN assignment on a BSSID or a traditional RADIUS-assigned VLAN would be done (e.g., configured through the wireless driver of the access point 103, etc.). Any traffic to/from that client would be bridged to/from that desired VLAN for the duration of that client's connection to the access point 103.

In some implementations, the provisioning of some network functionalities 210 may comprise operations at a lower level within the access point 103. According to various implementations, the proprietary traffic kernel module 136 previously discussed monitors all packets passing through the access point 103, and may be implemented without using reserved VLANs. As a specific example, in one implementation, if a client device 118 provided the passphrase associated with an Internet of Things (IOT) network type, the access point 103 would only allow frames destined to/from the Internet after the initial connection. However, if another client device 118 on the local network sends a packet to the IoT device 128, a channel will be opened to that IoT device 128 which allows the client device 118 to communicate with it, via whatever VLAN both devices are configured for. This is outside conventional operation, and may be accomplished through the contemplated traffic kernel module 136, according to various implementations.

The handshake process continues, with the access point 103 sending a third message 408 (i.e., encrypted GTK 424 and MIC 420), and the client device 118 sending a fourth message 410 acknowledging the receipt of the GTK 424 with an acknowledgement 422, as is known in the art. At this point, both access point 103 and client device 118 will program the PTK 414 into their hardware encryption/decryption modules, and any further traffic will be encrypted/decrypted using that key. WPA2-AES uses this key to ensure that every frame is encrypted and "signed" using the Message Integrity Check (MIC 420). According to various implementations and as is customary/designated in WPA handshakes, after the fourth message 410 in the handshake 400, the keys are programmed into the client- and AP-side hardware and the client device 118 is allowed to send/receive data frames, enjoying all the functionalities associated with the provided passphrase 402 that the client device 118 used and the access point 103 authenticated. According to various implementations, when the client device 118 actual connects, the authenticator (i.e., hostapd) informs the traffic kernel module 136 what policies to enforce based on the passphrase used, now tied to the unique identifier 112*a* of the client device 118.

Figure 5:
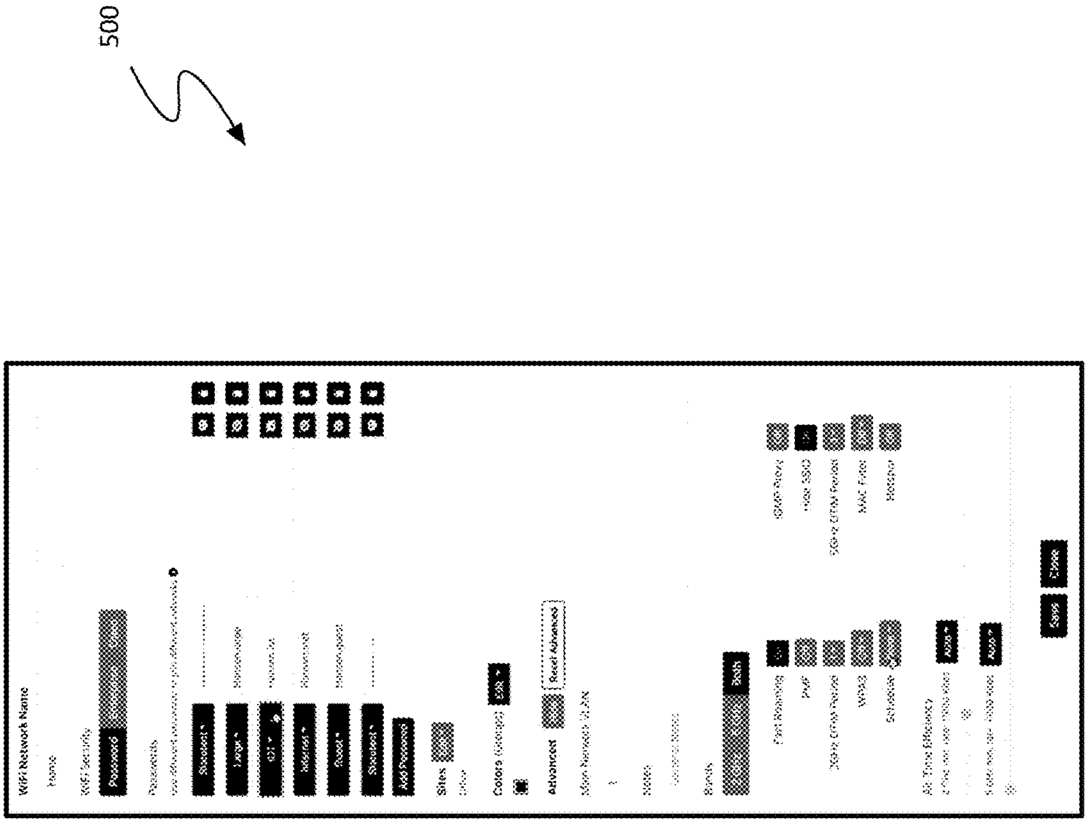
FIG. 5 is a configuration interface.

FIG. 5 is a non-limiting example of an administrator user interface 500 for configuring a mutable network system 100, according to various implementations. As shown, the interface 500 allows for the definition of various passphrases which are associated with different network types, which may also be referred to as sets of network policies 134. In some implementations, the network functionalities 210 that make up each of these network types may be predefined, and outside the end administrator's control (e.g., simplifying the system 100 to be operated and maintained by a novice consumer, etc.). In other implementations, various characteristics of one or more of these network types may be defined or modified through the administrator user interface 500. In still other implementations, the user configuring the system (i.e., the administrator 122) may be able to define custom network types.

The exemplary user interfaces shown are rendered by a web browser accessing an interface 500 provided by the contemplated mutable network device 102, according to various implementations. In some implementations, the mutable network device 102 may be configured through a web interface, while in other implementations the mutable network device 102 may be configured and/or monitored by the administrator 122 through other interfaces including, but not limited to, an application, a mobile app, a command line interface (e.g., via SSH, etc.), and the like. In some implementations, the administrator 122 may access the management/configuration/monitoring interface(s) remotely, over the Internet (as shown in FIG. 1), while in other implementations the interfaces may be limited to access via a client device 118 local to the mutable network system 100 (e.g., on the wireless network 116, on a wired connection directly to the mutable network device 102, on a limited VLAN, etc.).

FIG. 5 shows various exemplary network types (i.e., sets of network policies 134), which will be discussed below. It should be noted, however, that this is not an exhaustive discussion of the network functionalities 210 that can be provided and managed by the contemplated system 100 using the contemplated method. As previously stated, the mutable network system 100 and device 102 may be used to manage any network functionality 210 that may be provided to the client device 118 of a user 120, based on the passphrase they provide, according to various implementations. Thus, this system 100 and device 102 may be used with other "types" of networks beyond the non-limiting examples discussed below, as well as with network functionalities beyond the examples provided herein.

A "standard" or "small" network may refer to a wireless network 116 that is configured for use with a limited number of client devices 118 (e.g., less than 100 Wi-Fi devices, etc.). In some implementations, this network type may provide unrestricted layer-2 network access, and may meet the most basic needs of consumer-level applications (i.e., providing client devices 118 access to LAN/WAN). On the other hand, a "large" network is optimized for large numbers of Wi-Fi devices (e.g., hundreds, thousands, etc.). As a specific example, in some implementations of a "large" network, wireless broadcast traffic may be restricted while also employing proxy ARP and proxy MDNS to enable device-to-device communication. While these size optimizations are the primary characteristics of the standard/small and large network types, in some implementations such optimizations, big or small, may also be provided by some or all of the other network types (e.g., a default network policy 234, etc.).

An "Internet-only" network may restrict connected client devices 118 to communicate solely with a VLAN's router, preventing access to other assets within the local network. A similar concept is seen in the "Guest" network type, where the client device 118 is restricted to communication with the VLANs router, in addition to IOT-type devices on the wireless network 116. As a specific example, a consumer-level use case for the "guest" network would be to allow a visitor in the home to have access to the Internet, as well as various smart appliances and fixtures such as lights, sensors, speakers, and the like, without providing the ability to communicate with home computing devices or equipment such as a printer 130 or NAS 126.

The "IOT" network type may be restricted to communication with the VLAN's router (i.e., Internet-only access), and can also be reached by other client devices 118 on the wireless network 116 if they initiate the connection. However, the client devices 118 on an "IOT" type network (i.e., IoT devices 128) cannot initiate connections to other devices on their own. In other words, they can respond to questions and requests, but are not allowed to start conversations with the local devices. This provides a greater degree of security to the other devices being networked by the same systems. In the past, IoT devices 128 have provided an attractive attack surface for network intruders, since many IoT devices 128 lack the ability for much beyond authenticating to join a network 116, due to the need to minimize expense and/or power consumption. The "IOT" network type limits the type of attacks possible through an IoT device 128.

Additionally, in some implementations, the contemplated mutable network device 102 may also be configured to provide one or more VLAN interfaces, which may be in addition to VLANs utilized to create the network types previously discussed. Also, in some implementations, the administrator interface 500 may also allow an administrator 122 to force a specific network type based on the device's unique identifier 112 (e.g., MAC address, etc.). While this may defeat some of the purpose of attaching functionalities to passphrases, it may be beneficial to be able to define a separate set of network policies 134 for a subset of an already existing and authenticated group of client devices 118, without requiring that subset to be reintroduced to the wireless network 116 with a different passphrase. This may be of great benefit in situations where there is a large number of client devices 118 that stay attached to the wireless network 116 (e.g., IoT devices 128, computers 121 in a library or school, etc.).

As shown in FIG. 5, the administrator interface 500 may also allow the administrator 122 to define other characteristics of a wireless network 116 or access point 103. Examples include, but are not limited to, frequency band, broadcast settings, air-time efficiencies, and any other network attribute known in the art. As a specific example, in one implementations, a single SSID 304 may be overloaded to provide access across multiple bands, under a single passphrase. This is advantageous over the traditional approach of providing a different SSID 304 for each band, often leading users to be confused as to which network they should join. In some implementations, the mutable network device 102 may employ the IEEE 802.11k and 802.11v standards to give the client devices 118 informed decisions on which band to use.

In some implementations, communication between two different network types may be facilitated. For example, in one implementation, if two different passphrases allow two different client devices 118 to join two different VLANs, those devices 118 will not be able to communicate with each other unless there is a router that routes traffic between the two VLANs. VLANs are each discrete layer-2 networks by definition, and devices can only communicate across VLANs via a separate router. Some implementations of the contemplated system also bridge/route VLANs for this and other purposes (e.g., automatic backup of network routing via the access point 103 for cases when the DHCP server does not reply, etc.).

However, client devices 118 on the same VLAN are allowed to communicate with each other unless a network policy 134 inhibits frames from being bridged between the clients. This filtering occurs regardless of the clients being connected to the same access point 103 or different access points 103, according to various implementations. For example, in one implementation, Internet-only clients will pass traffic on to the VLAN that they are configured for, but any frames that are not destined for the gateway will be dropped by the access point 103.

As discussed with respect to FIG. 2, a scheduled network policy 220 allows an administrator 122 to condition the provision of one of more network functionalities 210 on a schedule 222. For example, according to various implementations, access to the wireless network 116 may be enabled or disabled based on this schedule 222. This is an attractive functionality on the consumer-level. As a specific, non-limiting example, a family may configure the mutable network device 102 to provide a wireless network 116 in the home for parents and children, all under the same SSID 304. The passphrase used to join the kids to the network 116 may be linked to the scheduled network policy 220 providing internet access that may be disabled at times when the children are supposed to be doing schoolwork or in bed sleeping.

Figure 6:
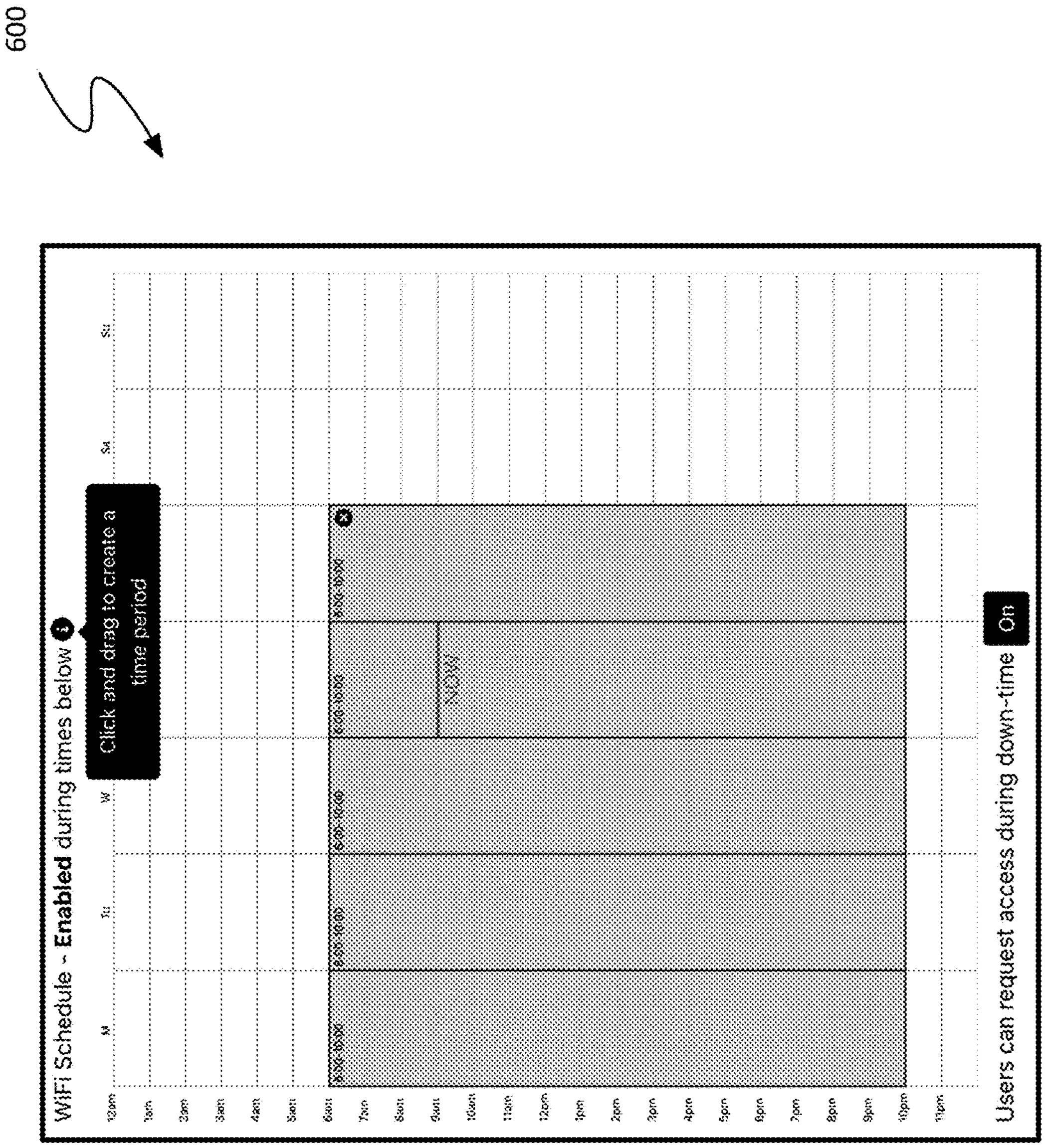
FIG. 6 is a configuration interface for a scheduled network policy.

FIG. 6 is a non-limiting example of a user interface 600 for defining a schedule 222 for a scheduled network policy 220. In some implementations, the schedule 222 may also be modified through an API. As shown, the schedule 222 may be configured by dragging blocks of time around a week calendar, similar to some calendar software. The blocks may be used to define a particular state of the network 116, whether it is enabled or disabled, or other functionalities.

Some conventional network systems allow for the definition of similar access schedules. However, those conventional systems disable the network 116 completely when the schedule dictates that it should be disabled, causing the network 116 to cease broadcasting the SSID 304, becoming invisible to users who cannot manually provide the SSID 304. Advantageously, the contemplated system 100 and device 102 are able to disable the network access according to a schedule 222, and still broadcast the SSID 304 while that access is disabled for some. In some implementations, this allows for the network 116 under one passphrase to be disabled per the schedule 222, but that same SSID 304 accessed with a different passphrase may be operating as usual.

Figure 7:
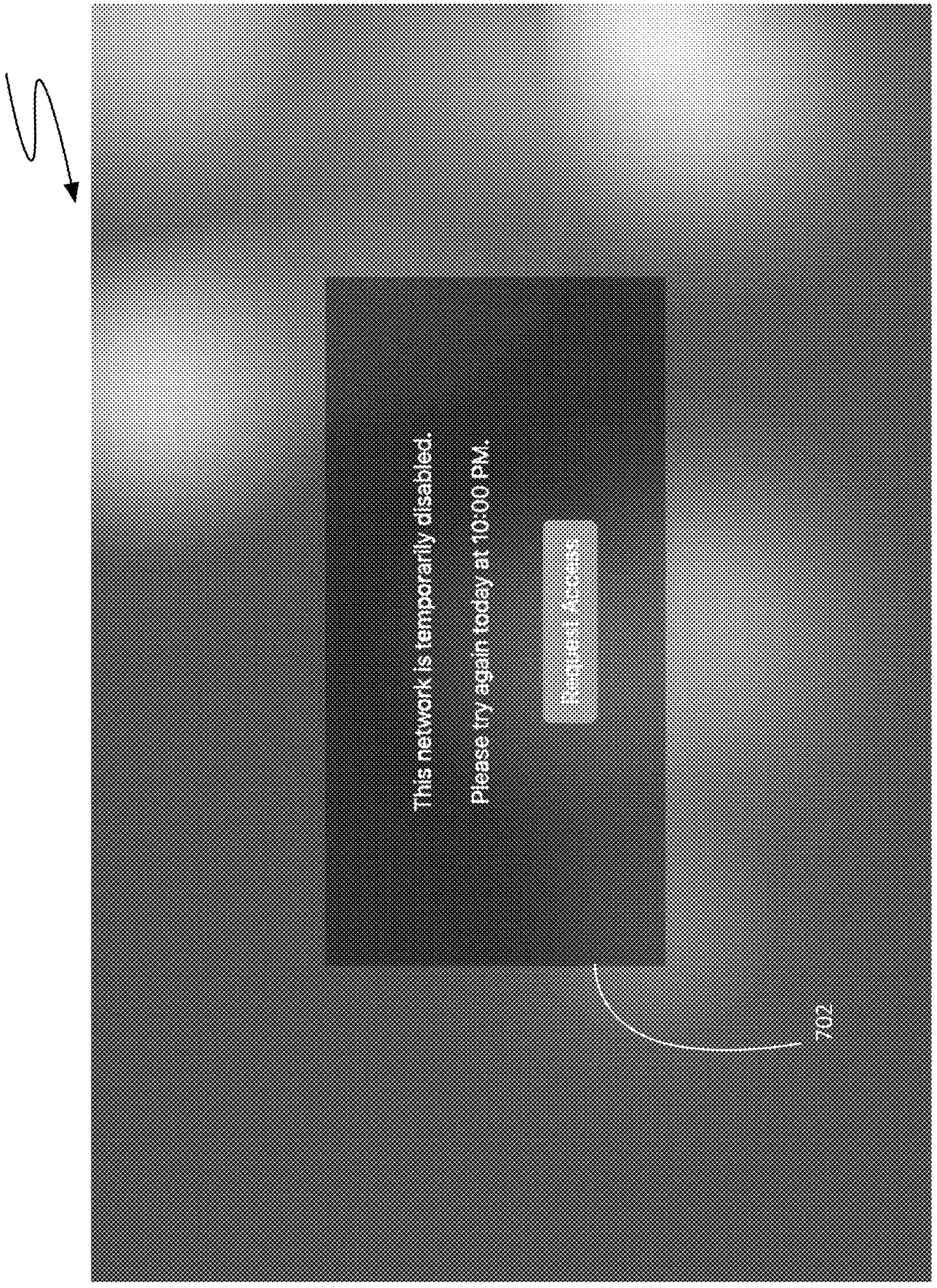
FIG. 7 is a captive portal with a user interface.

According to various implementations, during the period of time when wireless network access is disabled by the schedule 222, the SSID 304 continues to be broadcast so that client devices 118 can try to connect. However, instead of providing full access, a captive portal 700 may be presented to the user 120, indicating that the wireless network 116 is currently offline. FIG. 7 shows a non-limiting example of such a captive portal 700. In some implementations, the administrator 122 may configure the captive portal 700 to indicate that a user 120 can request a schedule exception, or access outside the defined schedule 222 (e.g., the "request access" button, etc.).

FIG. 7 is a non-limiting example of a captive portal 700 with a user interface 702. In some implementations, the contemplated mutable network device 102 may be configured with a captive portal 700, allowing the access point 103 to serve as a hot spot that redirects a client device 118 to a specific pages upon first connecting. For example, a coffee shop may provide free WIFI, displaying the passphrase to gain access on a sign. Upon connecting with that passphrase, the user 120 is presented with a branded welcome page, which the coffee shop may use to promote specials or events, or take the user 120 to a customer loyalty sign-up page.

In some implementations, the administrator interface 500 of the mutable network device 102 may be used to create a captive portal 700. Similar to the schedule functionality previously discussed, in some implementations this captive portal 700 may be displayed to everyone, while in other implementations it may only be shown to people using a particular passphrase. Furthermore, in some of the implementations where the captive portal 700 is the default, a passphrase may be given the ability to "Bypass Hotspot" (see FIG. 9). A user authenticating with such a passphrase is never shown the captive portal 700 that is being enforced on other users, according to various implementations.

Figure 8A:
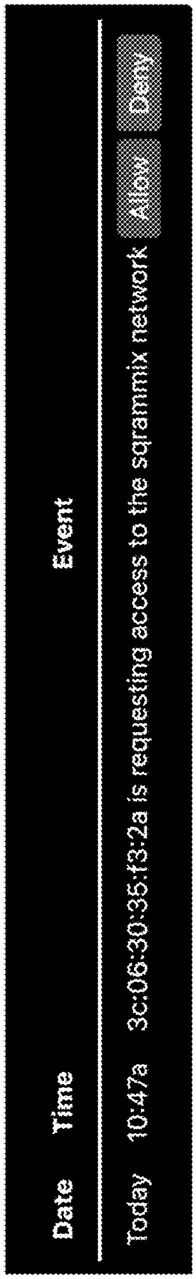
FIGS. 8A and 8B are network administrator messages.
Figure 8B:
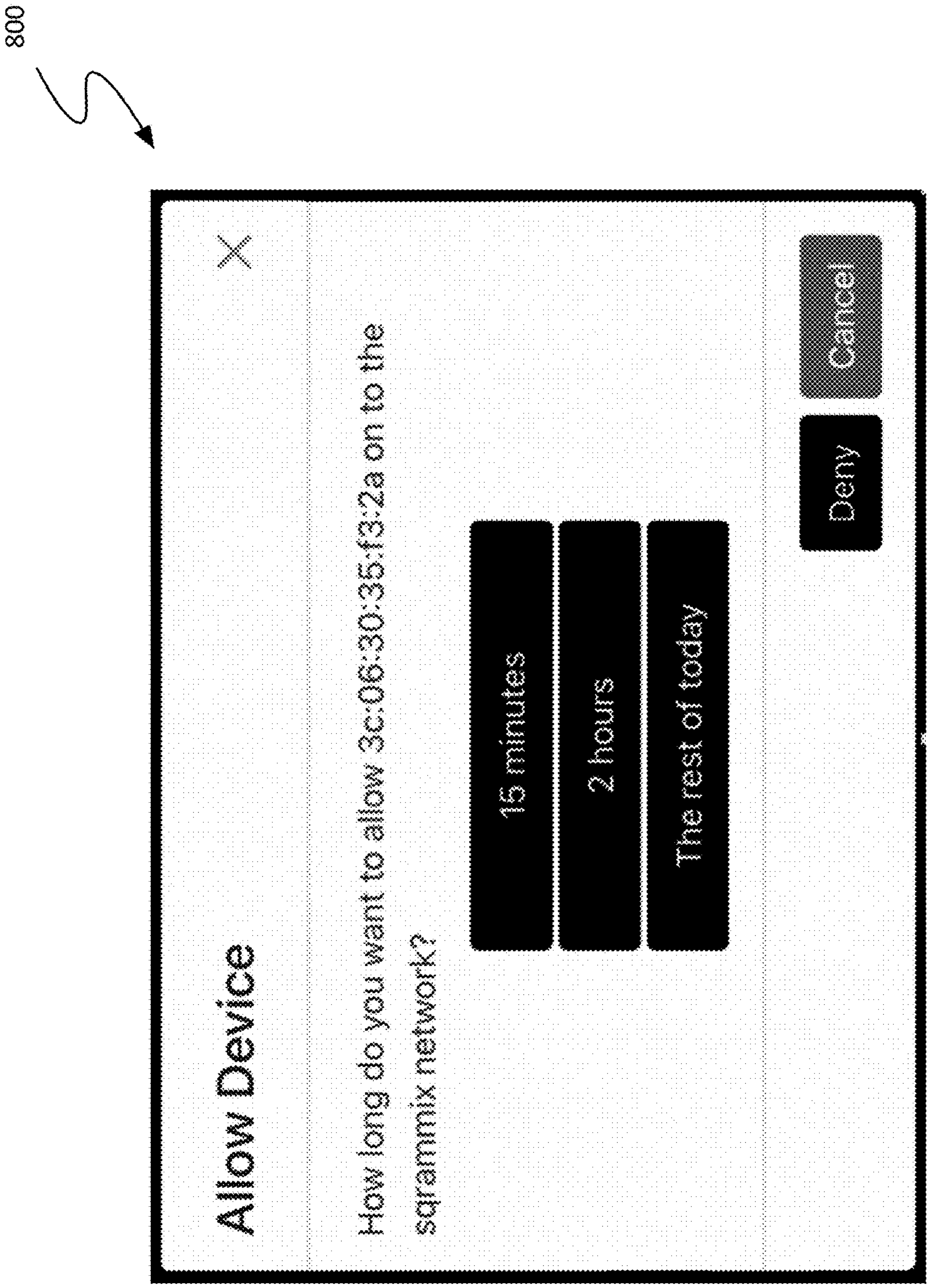

FIGS. 8A and 8B are non-limiting examples of network administrator notifications 800. In some implementations, if the user requests access to the otherwise unavailable wireless network 116 (e.g., during scheduled downtime, etc.), the network administrator 122 will be notified of the pending request. The administrator 122 can then allow or deny the user's request, as shown in FIGS. 8A and 8B, according to various implementations. In some implementations, the administrator 122 may be notified and able to respond through standard and mobile interfaces. In some implementations, the ability to make such a request may be passphrase-dependent, while in other implementations it may be an option provided to all authenticated client devices 118. Upon receiving permission from the administrator 122, the client device 118 is immediately allowed access to the defined functionalities associated with their passphrase, according to various implementations.

Figure 9:
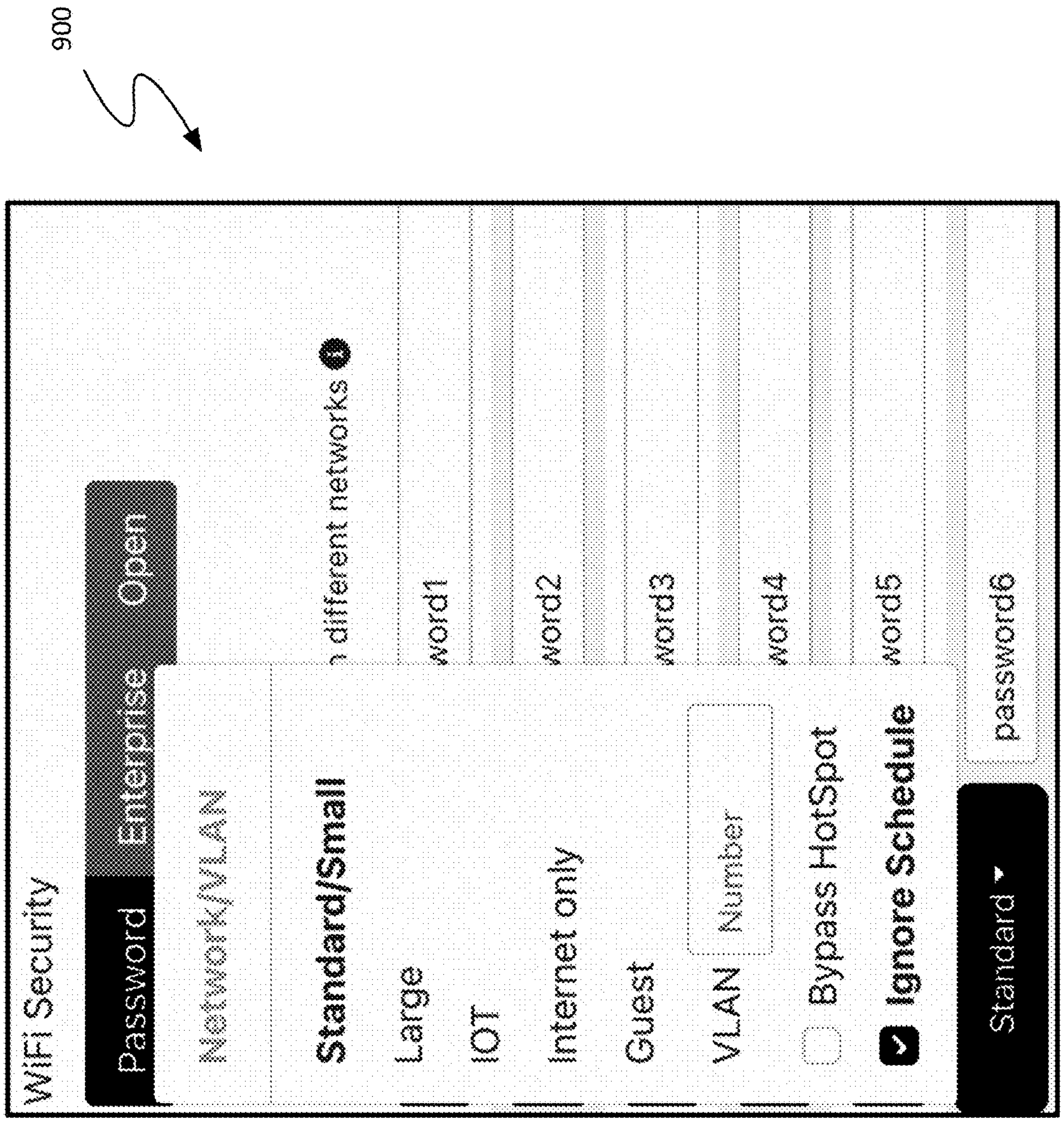
FIG. 9 is a configuration interface for defining a policy exception.

In some implementations, a schedule 222 may be defined on a per-passphrase basis. In other implementations, the definition of a schedule may be applied to all access, unless an exception is made (i.e., a default network policy 234). FIG. 9 shows an exemplary interface for defining the functionalities under a passphrase. One option provided is "Ignore Schedule". A passphrase configured to ignore the scheduled network policy 220 will have full access to the network and functionalities connected to that passphrase, at any time. Returning to the example of setting a schedule for a home network so the kids aren't able to stream videos all night instead of sleeping, the parents would most likely prefer to make their network use decisions on their own, and not on a schedule. By defining a passphrase that has "Ignore Schedule" enabled, the adults can get on the network at any time, and are never presented with the captive portal 700, even if the schedule has disabled the same network for devices using a different passphrase that does not ignore the schedule. Furthermore, in some of the implementations where the captive portal 700 is the default, a passphrase may be given the ability to "Bypass Hotspot" (see FIG. 9). A user authenticating with such a passphrase is never shown the captive portal 700 that is being enforced on other users, according to various implementations.

Much of the discussion above has been done in the context of a mutable network device 102 that also functions as an access point 103, and is being used to bring advanced networking functionality traditionally confined to large-scale commercial implementations to consumer-level equipment and applications. The provisioning of different network functionality to client devices 118 depending on the passphrase used is facilitated by the fact that, in many implementations, the authentication process 300 between the client device 118 and the wireless network 116 takes place in an exchange between the mutable network device 102 (also serving as access point 103) and the client device 118 (e.g., the four-way handshake 400). While this may be sufficient in the consumer level applications such as a home wireless network or a hotspot used by a small business, it may be difficult to implement on larger scales (e.g., campus, stadium, offices, etc.) without utilizing a centralized authentication system using a protocol like RADIUS (Remote Authentication Dial-In User Service). The use of a centralized authentication system can be much more scalable than a wireless network made entirely of access points 103.

Additionally, while the contemplated mutable network device 102 is able to put enterprise-level functionalities in the hands of consumers, they are also able to provide functionality that is not available at any level of sophistication, as discussed above. However, implementations of the contemplated mutable network device 102 and system that can operate in conjunction with a centralized authentication system or server cannot determine which set of network policies to implement in the same way as discussed in the implementations above.

The previously discussed implementations of the mutable network device 102 implemented a set of network policies for a client device based on the passphrase used to authenticate it to the wireless network (e.g., through a four-way handshake 400, etc.). The cryptographic keys that are exchanged during the four-way handshake 400 can be tied directly and consistently to a user 120 or group of users 120 because they are derived from the SSID and passphrase. However, in a network with centralized authentication, that same four-way handshake 400 is based on a cryptographic key that is derived from the successful negotiation between the supplicant (i.e., client device 118) and the authenticator (e.g., RADIUS server, etc.), according to various implementations. This key is typically session-specific and thus cannot be matched against more than a single time.

As a specific example, in a RADIUS-authenticated system, a Master Session Key (MSK) is generated as part of the Extensible Authentication Protocol (EAP) authentication process. The MSK is tied to a specific session and is not reused across sessions, enhancing security. Instead of the SSID and passphrase, the PMK 412 is generated using the MSK. Advantageously, the mutable network device 102 contemplated herein is adaptable for use in centrally authenticated networks, provisioning different network functionality to different client devices 118 based on some aspect or artifact from the authentication process that is tied to a specific user 120 or group of users 120, according to various implementations.

Like the implementations discussed above, the implementations of the mutable network device 102 discussed below are able to provide specific, even unique, functionality to different client devices 118 based on who they are, without introducing disruptive complexity like many different networks/SSIDS. Some implementations are compatible with standard centralized authentication protocols like RADIUS, so the benefits of the mutable network device 102 can be brought to a large-scale network without requiring all new equipment or protocols.

It should be noted that while the following discussion will be done in the context of a network that uses the RADIUS authentication protocol, implementations of the contemplated mutable network system, method, and device may be adapted for use with other centralized authentication protocols, including protocols yet to be developed. The fact that the following discussion is done in the context of a RADIUS server should not be interpreted as a limitation, but rather an example of how the contemplated system, method, and device may be adapted for use outside of the four-way handshake 400 discussed above.

Figure 10:
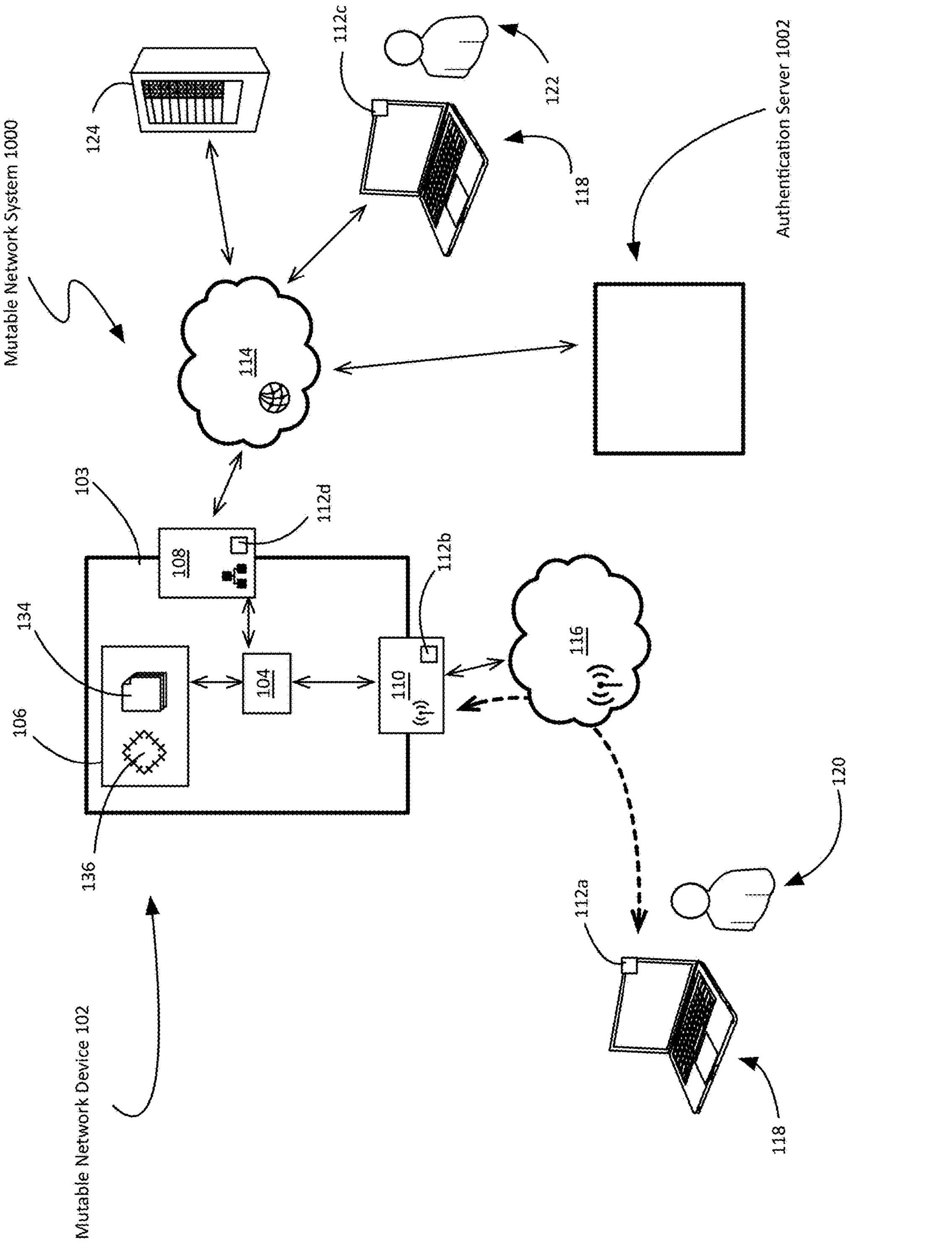
FIG. 10 is a schematic network view of a mutable network system using an authentication server.

FIG. 10 is a schematic network view of a non-limiting example of a mutable network system 1000 used in conjunction with a centralized authentication protocol implemented using an authentication server 1002. Apart from the addition of the authentication server 1002, which is communicatively coupled to the mutable network device 102, FIG. 10 is very similar to FIG. 1. It should be noted that many of the exemplary client devices 118 shown in FIG. 1 have been omitted from FIG. 10. This was done for clarity; according to various implementations, the mutable network system 1000 may be used in conjunction with that same wide array of device types (and network types), independent of whether or not the wireless network 116 makes use of an authentication server 1002.

Furthermore, while the non-limiting example shown in FIG. 10 only makes use of a single access point 103, the mutable network system 1000 configured for use with a centralized authentication protocol will typically be used in wireless networks that would require multiple access points 103. Indeed, in some implementations, the mutable network system 1000 may be used in network environments with dozens of access points 103 providing connectivity to hundreds of client devices 118, or more.

Additionally, while the mutable network device 102 shown in FIG. 10 is also the access point 103, in other implementations the mutable network device 102 may be separate from the access point(s) 103. As will be discussed below in the context of FIGS. 12B and 12C, in some implementations the mutable network device 102 could be entirely removed or insulated from the authentication process, operating only on information provided by the authentication server 1002 at the end of the authentication process.

The discussion of these implementations of the mutable network system 1000, method, and device 102 that operate alongside an authentication server 1002 will require a slightly expanded definition of client device 118. In the context of the present description and the claims that follow, a client device 118 is any device that would need to provide a credential or authentication asset (e.g., passphrase, certificate, token, username, etc.) to connect to the wireless network 116.

In the context of the present description and the claims that follow, an authentication server 1002 is a server that is configured to implement an authorization/authentication protocol granting some form of access to a network. The following discussion will be done in the context of implementations that are interacting with an authentication server 1002 that is a RADIUS server. In other implementations, the authentication server 1002 may use a different protocol or system including, but not limited to, TACACS+, Kerberos, Active Directory, LDAP, Diameter, OpenID Connect, SAML, and the like. In some implementations, the mutable network system 1000 may comprise a single authentication server 1002, while in other implementations the role may be filled using multiple authentication servers 1002 operating together, as is known in the art.

Figure 12A:
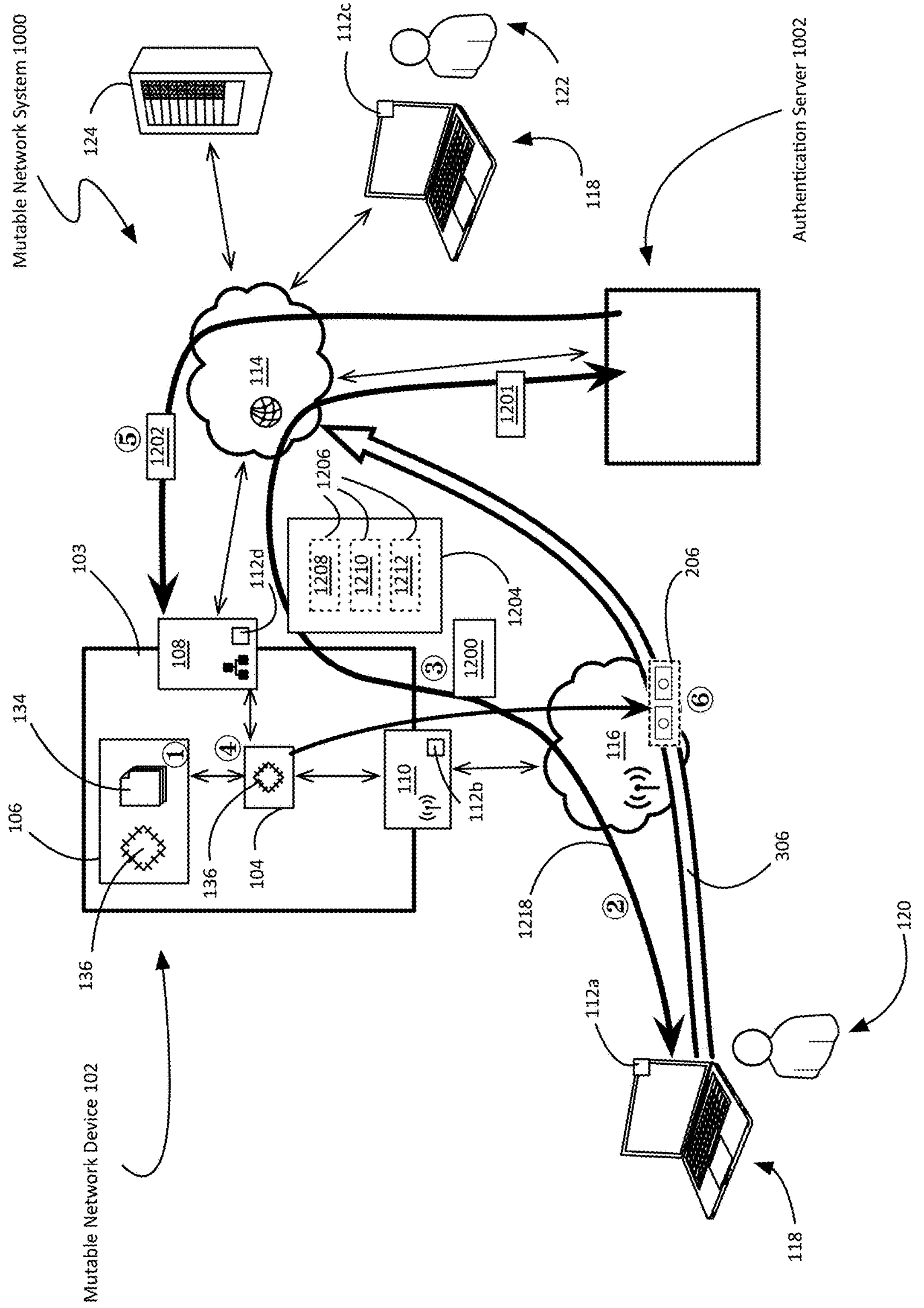
FIG. 12A is a schematic network view showing a process flow of the contemplated method for modifying functionality within a mutable network system based on an applied authentication asset that is visible to a mutable network device.
Figure 12B:
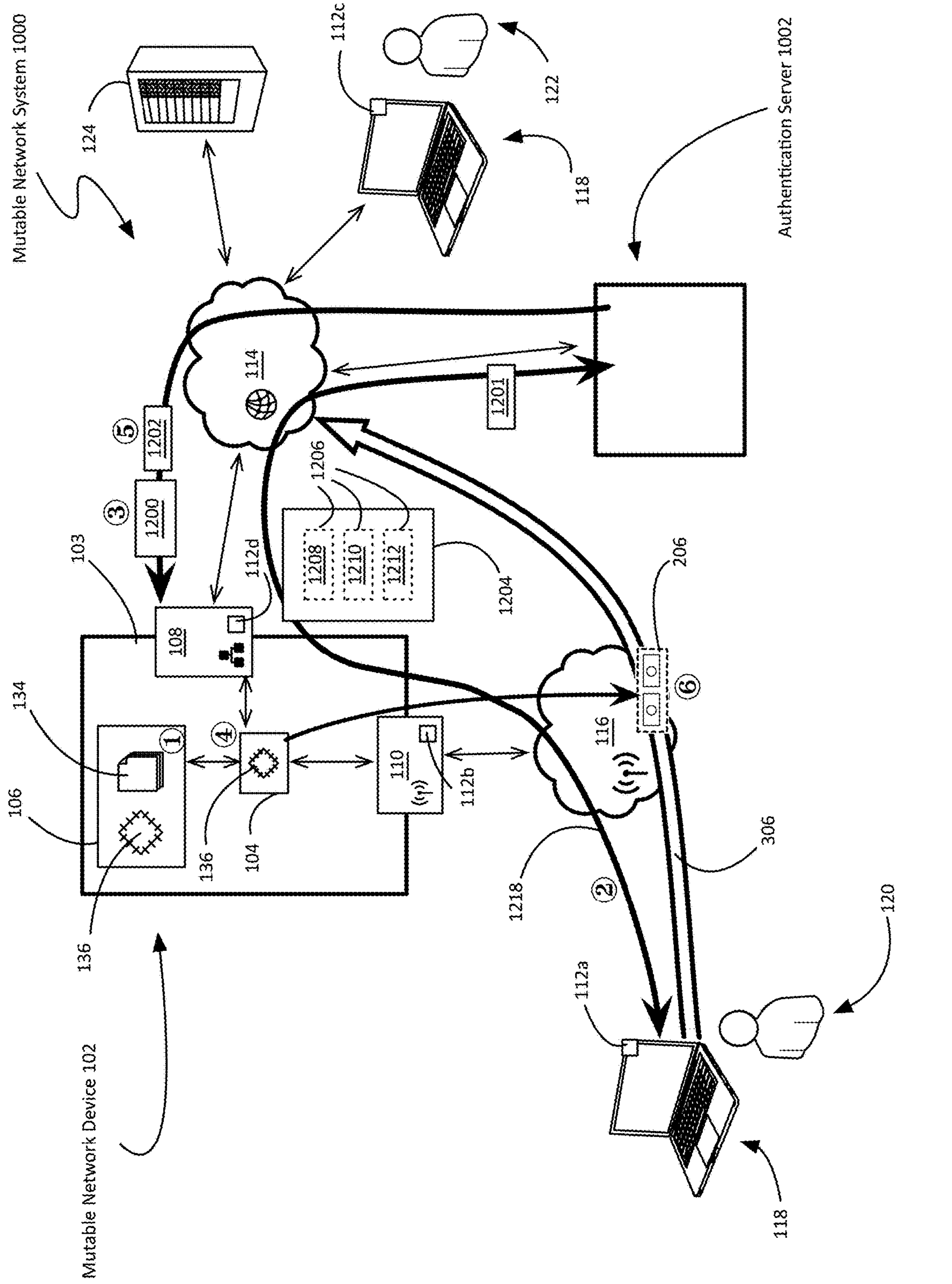
FIG. 12B is a schematic network view showing a process flow of the contemplated method for modifying functionality within a mutable network system based on an applied authentication asset that is received from the authentication server.
Figure 12C:
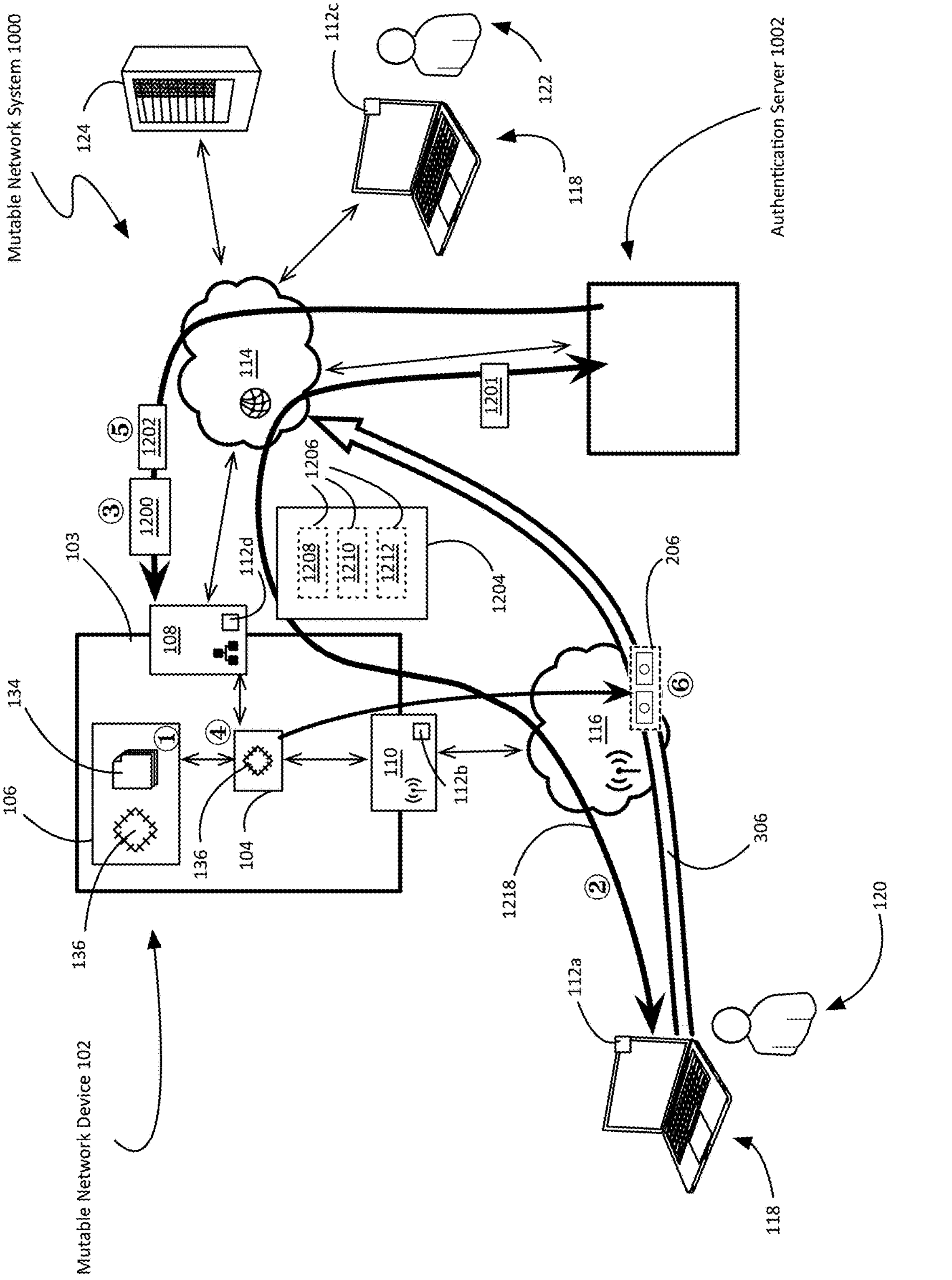
FIG. 12C is a schematic network view showing a process flow of the contemplated method for modifying functionality within a mutable network system based on an applied authentication asset that is obtained and matched by the authentication server.

Even limiting the examples being discussed to the authentication server 1002 being a RADIUS server, there are a variety of ways the authentication may take place. FIGS. 12A-12C will examine some of the more common pathways to authentication known in the art, and the different points at which the mutable network device 102 is able to determine which set of network policies should be provided to a particular client device 118, based upon an authentication asset.

It should again be noted that the entire discussion of the mutable network device 102 and mutable network system 100 above with respect to FIG. 1, above, is equally applicable to this mutable network system 1000 with centralized authentication, with the simple expansion of "passphrase" to "authentication asset" (which encompasses passphrases). Various examples of authentication assets will be discussed, below.

Figure 11:
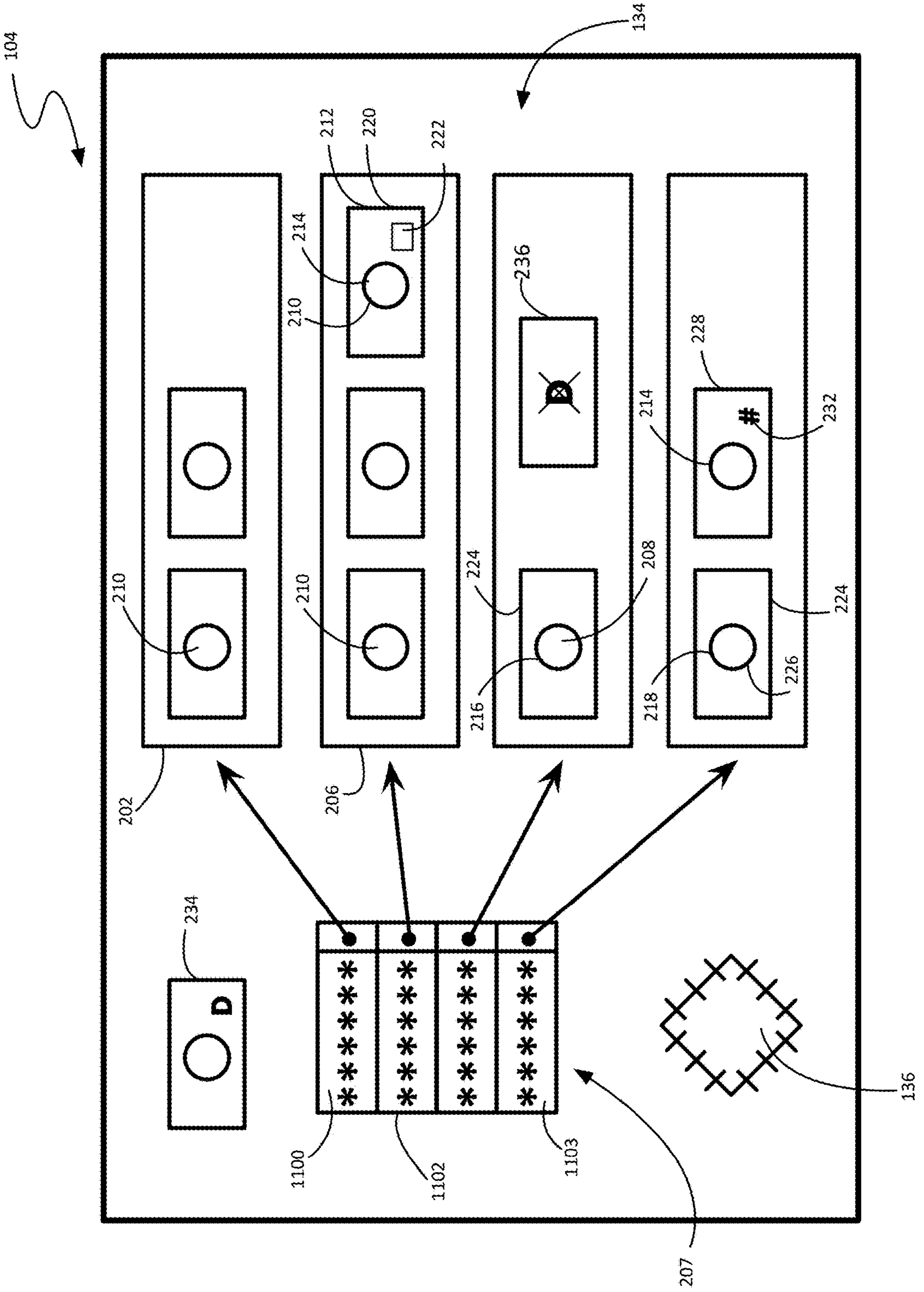
FIG. 11 is a schematic view of the memory of a mutable network device used in conjunction with an authentication server.

FIG. 11 is a schematic view of a non-limiting example of the memory 106 of the mutable network device 102 of FIG. 10. Specifically, FIG. 11 shows schematic representations of non-limiting examples of a plurality of authentication assets (e.g., first authentication asset 1100, second authentication asset 1102, etc.) and network policies 134 (e.g., first set of network policies 202, second set of network policies 206, etc.), in addition to a traffic kernel module 136.

It should be noted that while the following discussion is done in the context of a first authentication asset 1100 and a second authentication asset 1102 and associated sets of network policies 134, this is done for illustrative purposes. In other implementations, the contemplated mutable network device 102 can manage and modify the functionality of a wireless network 116 based upon numerous unique authentication assets. The discussion of first and second authentication asset should not be interpreted as limiting the contemplated system 1000, method, and device 102 to only two different authentication assets.

As previously mentioned, a network policy 134 specifies one or more network functionalities 210 that may be provided to a client device 118. In some cases, a network policy 134 may also comprise a limitation that governs the context in which the defined functionality 210 or functionalities 210 is made available. Some network policies 134 may comprise a single network functionality 210, while others may specify multiple network functionalities 210, which may be beneficial in the case of a collection of network functionalities 210 that are typical to many of the authentication assets being configured for the system 1000. Those commonly shared (but not universal, as will be discussed below) could be specified within a single network policy 134 to speed up the definition of new authentication assets with this shared functionality.

In the context of the present description and the claims that follow, an authentication asset is a piece of information or data that is related to a process of authenticating a client device 118 to a network. Examples include, but are not limited to, passphrases, usernames, certificates, certificate fields (e.g., common name, organization name, organizational unit name, etc.), tokens, and the like. An authentication asset is something that originates from the client device 118, or that can be traced back to a client device 118 or a specific user of a client device 118, according to various implementations.

The term authentication "asset" may imply that said information is forward looking, being useful for the authentication process. It may be better thought of as a fragment, which may be information that leads to eventual authentication, information that is yielded by the authentication process, or simply information that is bundled with information that is used for authentication purposes. In all cases, the authentication asset is something that is made available because of the authentication process. In some implementations, the authentication asset is chosen to be intrinsically linked to the authentication process such that any attempt to modify the asset (e.g., attempting to obtain the network functionalities of another user, attempting to escalate ones own network functionalities, etc.) will cause the authentication process to fail. Advantageously, some implementations of the contemplated mutable network device 102 may be adapted for use in a network environment without exposing new attack surfaces.

A passphrase is an example of an authentication asset. Thus, the previous discussion of network policies 134 and network functionalities 210 that was had in the context of FIG. 2, above, is equally applicable here. The following is a subset of that discussion made specific to authentication assets used in a mutable network system 1000 having centralized authentication. It is not intended to be exhaustive, or preclude any of the previous discussion.

Apart from the inclusion of authentication assets (e.g., first authentication asset 1100, second authentication asset 1102, specific authentication asset 1103, etc.) in the place of passphrases, the only other difference between FIG. 2 and FIG. 11 is the omission of the cryptographic keys 238. In some implementations adapted for use with a centralized authentication system (e.g., authentication server 1002), the cryptographic key generated by said authentication server 1002 (e.g., MSK) is session-specific, and is not reused. In such a case, there is no benefit to storing an encrypted version of the authentication assets, nor using said session-limited cryptographic keys as an authentication asset. As will be discussed in the context of FIGS. 12A-12C, the centralized authentication process offers other opportunities to obtain an authentication asset.

FIG. 11 shows a schematic view of various network policies 134. In practice, a network policy 134 may exist as a file, or part of a file, within the memory 106 of the mutable network device 102, according to some implementations. In other implementations, the network policies 134 may be stored as objects or records in a database. In still other implementations, the network policies 134 may be stored in any other form known in the art that makes them accessible to the mutable network device 102. In some implementations, the network policies 134 may also be stored at the authentication server 1002, which will be discussed in the context of FIG. 12C, below.

The mutable network device 102 is configured to define, receive administrator input to define, or assist in creating a compatible set of policies to be dispensed by the authentication server 1002 which define: a first set of network policies 202 associated with a first authentication asset 1100 for the wireless network 116, and a second set of network policies 206 associated with a second authentication asset 1102 for the wireless network 116, with the second authentication asset 1102 being different from the first authentication asset 1100, according to various implementations.

While this disclosure will focus on these two authentication assets and their associated sets of network policies 134 in order to better illustrate the advantageous ability of the contemplated mutable network system 1000 and device 102 to provide different functionality to different client devices 118 based upon the authentication assets used, other implementations may utilize more than two unique authentication assets.

While the authentication assets being associated with different sets of network policies 134 should be unique, the sets of network policies 134 do not. The association of two different authentication assets with the same set of network policies 134 is not precluded, according to various implementations. However, one of the novelties that makes the contemplated mutable network system 1000, device 102, and method advantageous over conventional wireless network hardware and methods is the ability to provide different functionality to different client devices 118 based entirely on what authentication assets they introduce while authenticating to the network. Thus, it is worth noting that in the non-limiting example of a first set of network policies 202 and a second set of network policies 206 shown in FIG. 11, there is a unique network policy 212 that is part of the second set, but not in the first set. In other examples, the unique network policy 212 could be a network policy 134 that is present in both sets, but is configured differently. A network policy 134 can be said to be found exclusively in one set by virtue of the configuration details, not just by the type of policy.

FIG. 11 shows a schematic representation of a number of examples of network policies 134, arranged in sets. The following discussion of these examples is not meant to be exhaustive. According to various implementations, a network policy 134 may be defined to specify any network functionality 210, with or without conditions or constraints.

A scheduled network policy 220 is a policy that conditions the periodic application of one or more network functionalities 210 on a schedule 222 that is defined within the policy 220. In some implementations, including the non-limiting example shown in FIG. 11, a scheduled network policy 220 may specify a network access 214. In other implementations, it could be a network filter, as will be discussed below. In still other implementations, the scheduled network policy 220 may be used to schedule the application of any network functionality 210, including but not limited to the network functionalities 210 represented schematically in FIG. 11 and/or discussed herein.

In some implementations, a scheduled network policy 220 may comprise a schedule 222 and one or more network functionalities 210 that are only applied when permitted by the schedule 222 (i.e., the schedule 222 specifies states of 'on' or 'off' for the specified network functionalities 210). In other implementations, the schedule 222 may instead describe a change in which network functionalities 210 are being applied. For example, it may be configured such that a first functionality is applied from 12 am to 8 am, a second functionality applied from 8:01 am to 9 pm, and a third functionality from 9:01 pm to 11:59 pm, every day. According to various implementations, the schedule 222 may repeat on a daily basis, a weekly basis, or a monthly basis. In other implementations, the schedule 222 may not be repeating, and instead specify a window of time in which a network functionality 210 such as access to a high-speed internet connection is available, after which the connection is limited to lower speeds.

As a specific example, in one implementation, a company may use a portion of a certificate common name (e.g., shift b) as an authentication asset for employees working that shift (e.g. standard business hours) to use on their various devices. The authentication asset may be associated with a scheduled network policy 220 that will only allow access to the Internet during a particular window of time. At the same time, employees that may be on-call at any time or who have variable shifts may use the same wireless network 116, having the same SSID, but with an authentication asset that is not associated with that network policy 134 (e.g., common name includes "IT staff"). The scheduled network policy 220 and its application to a similar but non-commercial use case was discussed in greater detail with respect to FIGS. 6-8, above.

According to various implementations, the scheduled network policy 220, along with other policies discussed herein, is implemented and enforced by a traffic kernel module 136, as discussed above. In some implementations, the traffic kernel module 136 interacts with various other entities (not shown) defined in the memory 106 and executed on the processor 104 of the mutable network device 102, including an authenticator (e.g., the process which handles the four way handshake discussed below, the entity that can determine which passcode is being used by a client device 118, etc.), a scheduler, and a configuration agent (e.g., the interface through which network policies 134 are defined and distilled into a format that can be implemented by the traffic kernel module 136, the authenticator, and the scheduler, etc.). The scheduler will tell the kernel module 136 when to enforce certain network policies 134, such as when to turn on and off network access. As previously discussed, in some implementations turning off access means redirecting to the captive portal that indicates the network is scheduled off. In some implementations, there may also be a web server running on each access point 103 which gets configured by the configuration agent. Thus, if the client device 118 is redirected to the web server's captive portal and enters a correct password or presents some other authentication asset through the web UI, it will allow access to the network for a configured period of time (default 4 hours), according to various implementations.

In the context of the present description and the claims that follow, a population policy 228 is a network policy 134 comprising a network access 214 and a population limit 232. The population policy 228 constrains the number of client devices 118 associated with a specific authentication asset 1103 and permitted to concurrently use the network access 214 to be, at most, equal to the population limit 232, according to various implementations.

In the context of the present description and the claims that follow, a default network policy 234 is a network policy 134 that specifies one or more network functionalities 210 that are applied to every network connection associated with the mutable network device 102, unless preempted by another network policy 134. In other words, a default network policy 234 could be thought of as being automatically added to every set of policies associated with an authentication asset by the mutable network device 102. According to various implementations, any network policy 134 or set of network policies may also be specified as the default network policy 234, to be automatically applied as though it is associated with every authentication asset. Continuing with the previous specific example of the resort, the population policy 228 could be declared a default network policy 234, such that it if automatically associated with any new authentication asset registered within the mutable network system 1000.

In some implementations, a default network policy 234) may be preempted by the use of a policy exception 236. In the context of the present description and the claims that follow, a policy exception 236 is a network policy 134 that preempts and negates the default network policy 234. In some implementations, associating a policy exception 236 with an authentication asset effectively removes all default network policies 234 from the set of policies associated with that authentication asset. In other implementations, a policy exception 236 may indicate specific policies that are not to be applied as a default network policy 234 to any authentication asset associated with said policy exception 236, allowing some defaults to apply and others not. As an option, in some implementations, a policy exception 236 may also be associated with, and automatically applied to, a client device 118 having a particular unique hardware identifier 112 (e.g., MAC address, etc.).

One network policy 134 not shown in FIG. 11 is a network filtering policy, which applies a filter on the network connection of the client device authenticated with an associated authentication asset. According to various implementations, the filter may be at least one of a content-based filter and an application-based filter.

FIGS. 12A-12C are network views showing process flows for non-limiting examples of three different authentication pathways by which an authentication asset (here, the applied authentication asset 1200) can be obtained and the appropriate network policies 134 enforced.

FIG. 12A is a network view showing a process flow for a non-limiting example of the contemplated method for modifying functionality within a wireless network 116 based on an applied authentication asset 1200 that is visible to the mutable network device 102. According to various implementations, the applied authentication asset 1200 is received from, or can be traced back to, the client device 118 from when the client device 118 is engaging in the authentication process 1218.

First, a first set of network policies 202 and a second set of network policies 206 are defined and associated with a first authentication asset 1100 and a second authentication asset 1102, respectively. See circle '1'. Regarding the definition of network policies 134, the previous discussion above regarding administrator interfaces and tools is also applicable in implementations having centralized authentication through an authentication server 1002. In some implementations, that interface may also assist in issuing certificates having the proper authentication asset (e.g., special field, part of common name, etc.).

Figure 13A:
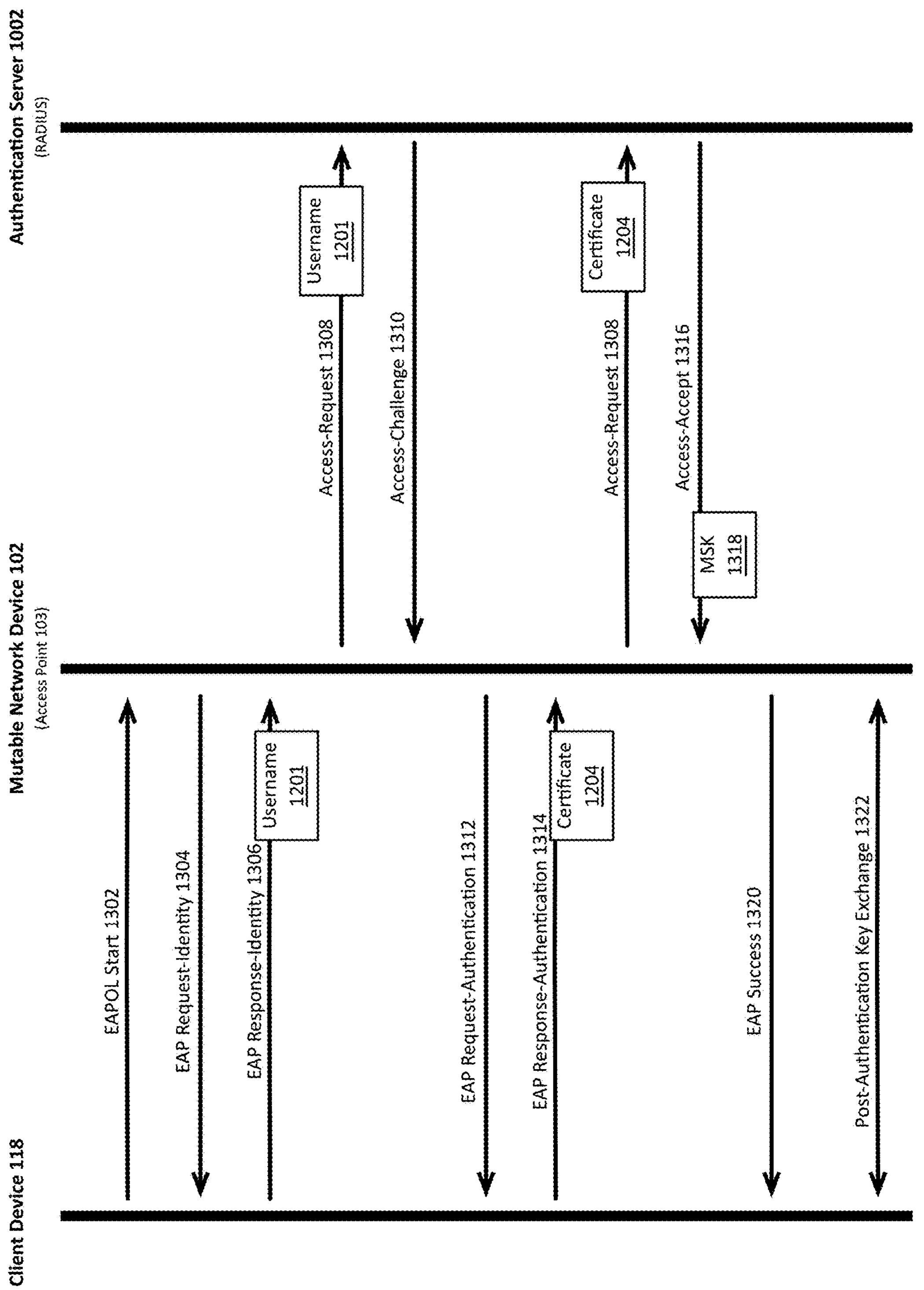
FIGS. 13A-13C are sequence diagrams showing how the mutable network system obtains an applied authentication asset in the context of the authentication process.
Figure 13B:
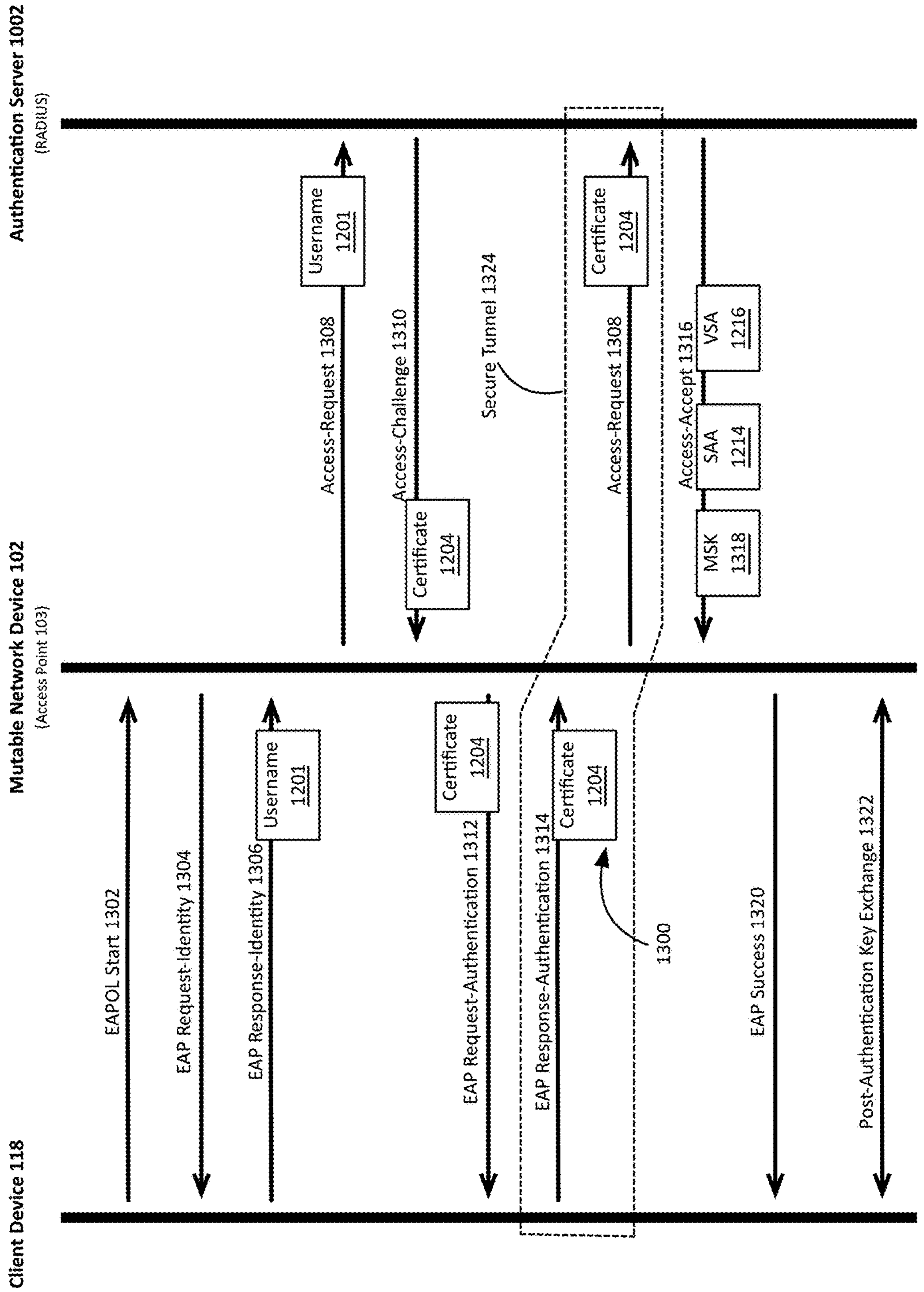
Figure 13C:
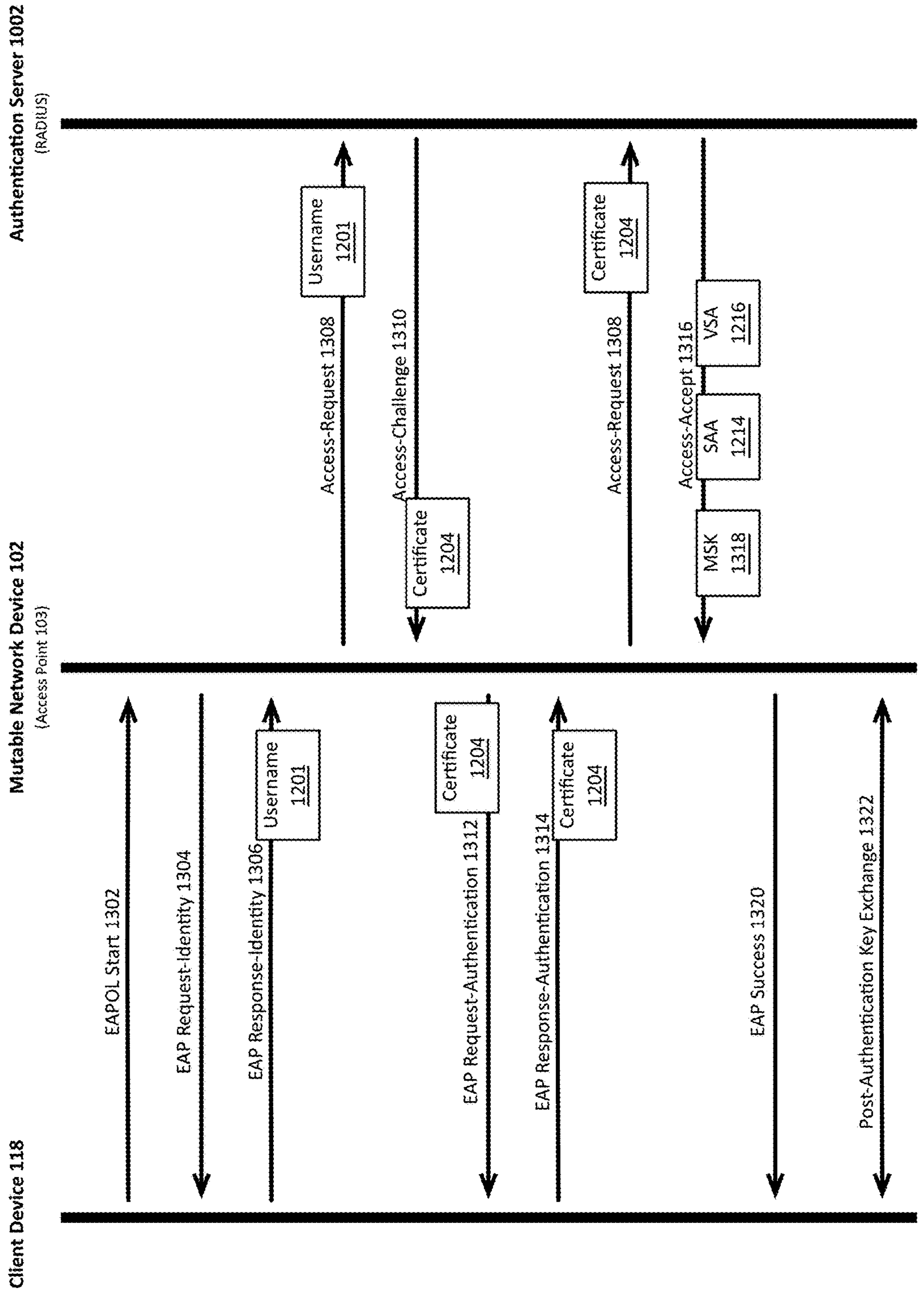

Next, the client device 118 engages in the authentication process 1218 with the authentication server 1002 to secure a network connection 306 with the wireless network 116. See 'circle 2'. Those skilled in the art will recognize that there are various processes through which a client device 118 may be authenticated by an authentication server 1002. FIGS. 13A-13C will examine the non-limiting examples the processes that are being used in FIGS. 12A-12C, respectively.

At some point in the authentication process 1218, an applied authentication asset 1200 that is related to the client device 118 seeking authentication is received. See 'circle 3'.

In the specific, non-limiting example shown in FIG. 12A, the mutable network device 102 (which here is also the access point 103 that the client device 118 is talking to) is able to obtain the applied authentication asset 1200 from the client device 118 without any assistance from the authentication server 1002. An advantage of this is that the authentication server 1002 can be completely ignorant of the mutable network system 1000. No changes in the operation of the authentication server 1002 or how it is set up would be required to transform an existing centrally authenticated network into a network belonging to a mutable network system 1000. A potential downside, though, is the reliance on elements that are being transmitted in the clear.

One example of an applied authentication asset 1200 obtainable by the mutable network device 102 from the client device 118 is a username 1201. As will be discussed in the context of FIG. 13A, an early part of the EAP RADIUS-based authentication process 1218 is the EAP Response-Identity message sent by the client with a username (to see if the authentication server 1002 is willing to move to the next step). This first volley is done in the clear, without encryption. That initially provided username 1201 is passed to the authentication server 1002 via the mutable network device 102 (i.e. access point 103 in this non-limiting example).

If the username 1201 provided is meaningful, it (or at least a part of it) could be used by the mutable network device 102 as the applied authentication asset 1200. However, it is common for a client device 118 to simply send "anonymous" or something similar, and authentication servers 1002 are often configured to simply accept that and move on to the more substantive exchange of credentials.

In some implementations, the authentication process 1218 may comprise EAP-TLS (Extensible Authentication Protocol-Transport Layer Security), a certificate-based method that makes use of certificates issued by a trusted certificate authority. In some implementations, the client device 118 may send its certificate 1204 to the authentication server 1002, by way of the mutable network device 102, in the clear, such that the mutable network device 102 can read it.

The use of a certificate 1204 that is visible to the mutable network device 102 opens up a number of possibilities for the applied authentication asset 1200. As is known in the art, X.509 certificates 1204 are TLV-based and extremely extensible. In some implementations, the applied authentication asset 1200 may be a standard field 1206 (e.g., common name 1208, organization name 1210, organizational unit name 1212, location, state, country, phone number, email, etc.).

In other implementations, the applied authentication asset 1200 may be part of a standard field 1206 (e.g., "manage" in a common name, etc.). In still other implementations, the applied authentication asset 1200 may be a value found in a field 1206 that is unique to the mutable network system 1000, as is known in the art. In some implementations, this mutable-system-specific field may specify the identity of a user or a group of users. In other implementations, it may be used to specify which previously defined set of network policies to provide to this client device 118 upon successful authentication.

Next, it is determined if the applied authentication asset 1200 matches one of the first authentication asset 1100 and the second authentication asset 1102. See 'circle 4'. In some implementations, including the non-limiting example shown in FIG. 12A, this determination is made by the mutable network device 102.

When it has been determined that the applied authentication asset 1200 matches the first authentication asset 1100 or the second authentication asset 1102, and the mutable network device 102 has received a confirmation 1202 from the authentication server 1002 that the client device 118 has been authenticated (see 'circle 5'), the wireless network 116 is configured to provide the associated set of network policies to the client device 118.

As previously discussed, in some implementations, this is accomplished by the mutable network device 102 configuring a traffic kernel module 136 within the mutable network device 102 (or an access point 103 that is not the mutable network device 102) to provide to the client device 118 the network connection 306 defined at least in part by the first set of network policies 202 if the applied authentication asset 1200 is the first authentication asset 1100 and defined at least in part by the second set of network policies 206 if the applied authentication asset 1200 is the second authentication asset 1102. See 'circle 6'

As previously discussed, the network functionalities 210 that the access point 103 may be configured, through network policies 134, to provide in response to a particular applied authentication asset 1200 include, but are not limited to, VLAN assignment/access, network type, permission to bypass a schedule or captive portal, and the like. Some of this configuration of the access point 103 may be done using conventional methods, according to various implementations.

In some implementations, the provisioning of some network functionalities 210 may comprise operations at a lower level within the access point 103. According to various implementations, the proprietary traffic kernel module 136 previously discussed monitors all packets passing through the access point 103, and may be implemented without using reserved VLANs. As a specific example, in one implementation, if a client device 118 provided the passphrase associated with an Internet of Things (IOT) network type, the access point 103 would only allow frames destined to/from the Internet after the initial connection. However, if another client device 118 on the local network sends a packet to the IoT device 128, a channel will be opened to that IoT device 128 which allows the client device 118 to communicate with it, via whatever VLAN both devices are configured for. This is outside conventional operation, and may be accomplished through the contemplated traffic kernel module 136, according to various implementations.

The previously discussed network types shown in FIG. 5, may be applied to client devices 118 authenticated by the authentication server 1002, just as they can be to client devices 118 authenticated purely through the four-way handshake 400. It should be noted that the previous discussion of network types (i.e., sets of network policies 134), was not an exhaustive discussion of the network functionalities 210 that can be provided and managed by the contemplated system 1000 using the contemplated method. The types previously discussed, and applicable in the centrally authenticated implementations contemplated herein, include "standard", "small", "large", "internet-only", "IOT", "Guest", and the like. Again, it is important to note that all of the features and functionality discussed in the handshake-centric implementations may be provided by the centralized authentication-based implementations.

FIG. 12B is a network view showing a process flow for a non-limiting example of the contemplated method for modifying functionality within a wireless network 116 based on an applied authentication asset 1200 that is not visible to the mutable network device 102 until it receives it from the authentication server 1002.

First, a first set of network policies 202 and a second set of network policies 206 are defined and associated with a first authentication asset 1100 and a second authentication asset 1102, respectively. See circle '1'. Next, the client device 118 engages in the authentication process 1218 with the authentication server 1002 to secure a network connection 306 with the wireless network 116. See 'circle 2'.

In some implementations, including the non-limiting example shown in FIG. 12A, the applied authentication asset 1200 is visible to the mutable network device 102 as it is introduced to the system 1000 by the client device 118. In other words, the applied authentication asset 1200 is being sent from the client device 118 to the authentication server 1002 through the mutable network device 102 in the clear, allowing the mutable network device 102 to grab it and compare it.

In other implementations, including the non-limiting example shown in FIG. 12B, the authentication process 1218 may comprise the creation of a secure tunnel through which the applied authentication asset 1200 (along with other secrets and credentials) may be safely passed, inaccessible to the mutable network device 102. Examples include EAP-PEAP (Protected EAP) or EAP-TTLS (Tunneled TLS) methods, which comprise the authentication server 1002 providing its own certificate 1204 to the client device 118, which is used to create the tunnel through which the remainder of the authentication process 1218 is carried out. This will be discussed in greater detail with respect to FIG. 13B.

In the case of EAP-PEAP, authentication proceeds using a username 1201 and password received from the client device 118 through the secure tunnel. In EAP-TTLS, the client device 118 provides its certificate 1204 through the tunnel. In both cases, the applied authentication asset 1200 is encrypted as it passes by the mutable network device 102 or access point 103. In implementations where the mutable network device 102 is responsible for determining which set of network policies to apply and has the ability to define the network connection for the client device 118, at least in part, based on said set of network policies, the mutable network device 102 is reliant on the authentication server 1002 to supply the applied authentication asset 1200.

At some point in the authentication process 300, an applied authentication asset 1200 that is related to the client device 118 seeking authentication is received. In some implementations, this is the mutable network device 102 receiving the applied authentication asset 1200 from the authentication server 1002 because the applied authentication asset 1200 is otherwise out of reach. See 'circle 3'.

The various stages of a RADIUS-based authentication process 1218 will be broken down and discussed with respect to FIGS. 13A-13C. As will be discussed below, a successful authentication from the authentication server 1002 (i.e., RADIUS server) ends with the transmission of an "Access-Accept" message that may include Server-Assigned Attributes 1214 (SAA), in addition to a cryptographic key (e.g., a Master Session Key) for use in further communications between the client device 118 and an access point 103. According to various implementations, a Server-Assigned Attribute 1214 is a configuration parameter or a piece of information provided by the authentication server 1002 to the network access server (e.g., access point 103) or client device 118 during the authentication process 1218. In implementations where the authentication server 1002 is a RADIUS server, these SAA 1214 are also referred to as Radius Assigned Attributes.

According to various implementations, an SAA 1214 may be sent as a Type-Length-Value (TLV), a structured way to encode data attributes within RADIUS messages. This structure ensures that the protocol can carry a variety of information in a standardized and extensible format. In some implementations where the applied authentication asset 1200 is sent to the mutable network device 102 by the authentication server 1002 as a SAA 1214, the SAA 1214 may be part of a defined standard (e.g., part of the RADIUS protocol defined by RFC 2865, etc.). As a specific example, in one implementation, the applied authentication asset 1200 may be the User-Name attribute, a standard RADIUS SAA 1214 defined in RFC 2865 as having attribute code 1. The use of an SAA 1214 that is a standard part of the authentication protocol as the applied authentication asset 1200 is advantageous because it does not require the authentication server 1002 to modify the way it operates to function within the contemplated mutable network system 1000.

In some implementations where the applied authentication asset 1200 is an SAA 1214, it may be an SAA 1214 that is a defined part of the standard or protocol (e.g., the User-Name attribute). However, as previously mentioned, the SAA 1214 are designed to be extensible. In some implementations, the SAA 1214 may be unique to the mutable network system 1000. The standards allow for the use of vendor-defined attributes to provide functionality that is provided by a particular vendor's hardware or software, but cannot be assumed to be provided by everyone. This is a subset of the Server-Assigned Attributes 1214 called a Vendor-Specific Attribute 1216 or VSA 1216.

According to various implementations, the applied authentication asset 1200 may be a VSA 1216 that identifies a user 120 or a group of users 120 such that the mutable network device 102 can provision an appropriate set of network policies. In other implementations, said VSA 1216 may be defined such that the applied authentication asset 1200 identifies the specific set of network policies already defined within the mutable network system 1000.

Next, it is determined if the applied authentication asset 1200 matches one of the first authentication asset 1100 and the second authentication asset 1102. See 'circle 4'. In some implementations, including the non-limiting example shown in FIG. 12B, this determination is made by the mutable network device 102.

When it has been determined that the applied authentication asset 1200 matches the first authentication asset 1100 or the second authentication asset 1102, and the mutable network device 102 has received a confirmation 1202 from the authentication server 1002 that the client device 118 has been authenticated (see 'circle 5'), the wireless network 116 is configured to provide the associated set of network policies to the client device 118.

As previously discussed, in some implementations, this is accomplished by the mutable network device 102 configuring a traffic kernel module 136 within the mutable network device 102 (or an access point 103 that is not the mutable network device 102) to provide to the client device 118 the network connection 306 defined at least in part by the first set of network policies 202 if the applied authentication asset 1200 is the first authentication asset 1100 and defined at least in part by the second set of network policies 206 if the applied authentication asset 1200 is the second authentication asset 1102. See 'circle 6'.

FIG. 12C is a network view showing a process flow for a non-limiting example of the contemplated method for modifying functionality within a wireless network 116, using a mutable network device 102, based on an applied authentication asset 1200 that is obtained and matched by the authentication server 1002. The main distinction between the implementations represented by FIG. 12B and the implementations represented by the non-limiting example shown in FIG. 12C is that in the present example, the set of network policies associated with the applied authentication asset 1200 are ultimately defined at the authentication server 1002, and applied throughout the wireless network 116 through the use of SAA 1214 as is done in traditional RADIUS-authenticated systems. However, as will be discussed, the contemplated method makes possible functionalities never before available through those conventional applications of centralized authentication.

First, a first set of network policies 202 and a second set of network policies 206 are defined and associated with a first authentication asset 1100 and a second authentication asset 1102, respectively. See circle '1'. In some implementations, these network policies may be defined on the authentication server 1002 in the same way that conventional RADIUS policies are defined. In other implementations, the mutable network system 1000 (e.g., the mutable network device 102, a cloud-based platform, etc.) may provide an interface to assist an administrator 122 in defining the network policies 134 and associating sets of them with different authentication assets (i.e., the first authentication asset 1100, the second authentication asset 1102, etc.). In some implementations, that interface may be similar to those discussed above in the context of networks with AP—or mutable network device-centric authentication (e.g., FIG. 5).

As a specific example, in one implementation, a mutable network device 102 may provide an interface to assist an administrator in defining policies and authentication assets. The mutable network system 1000 then outputs these definitions in a form usable to the authentication server 1002 being used. For example, in some implementations, the mutable network system 1000 may generate, or help generate, a vendor dictionary and policy files that would be used to implement network functionalities and policies that are beyond the standard features of the authentication protocol being used.

In some implementations, including the non-limiting example shown in FIG. 12C, the network policies 134 may be defined on, and stored on, the mutable network device 102 (or a cloud-based interface for the mutable network device 102, in some implementations) before being loaded into the authentication server 1002. In other implementations, the network policies 134 may only exist within the authentication server 1002 or some other hardware environment for the centralized authentication system.

Next, the client device 118 engages in the authentication process 1218 with the authentication server 1002 to secure a network connection 306 between the client device 118 and a wireless network 116. See 'circle 2'.

At some point in the authentication process 300, an applied authentication asset 1200 that is related to the client device 118 seeking authentication (e.g., a field 1206 of a certificate 1204 or part thereof, a username 1201 or part thereof, a password or other credential or part thereof, etc.) is received by the authentication server 1002.

Next, it is determined if the applied authentication asset 1200 matches one of the first authentication asset 1100 and the second authentication asset 1102. See 'circle 4'. In some implementations, including the non-limiting example shown in FIG. 12C, this determination is made by the authentication server 1002. In some implementations, this may be done in the same way it is done in conventional RADIUS-authenticated networks which provision particular resources such as VLANs or bandwidth for particular entities, as is known in the art. As a specific example, in some implementations, the authentication server 1002 may look up the policies associated with a username 1201 using another system such as Active Directory or LDAP that can associate network policies 134 with different users 120.

When it has been determined that the applied authentication asset 1200 matches the first authentication asset 1100 or the second authentication asset 1102, and the authentication of the client device 118 has been confirmed (see 'circle 5'), the wireless network 116 is configured to provide the associated set of network policies to the client device 118.

As previously discussed, in some implementations, this is accomplished by the mutable network device 102 configuring a traffic kernel module 136 within the mutable network device 102 (or an access point 103 that is not the mutable network device 102) to provide to the client device 118 the network connection 306 defined at least in part by the first set of network policies 202 if the applied authentication asset 1200 is the first authentication asset 1100 and defined at least in part by the second set of network policies 206 if the applied authentication asset 1200 is the second authentication asset 1102. See 'circle 6'

Although in some implementations, the network policies 134 associated with the applied authentication asset 1200 are implemented through the authentication server 1002 sending SAA 1214 to devices in the wireless network 116 (e.g., mutable network devices 102, access points 103, etc.), the functionalities available through the contemplated mutable network system 1000 are not found in conventional networks that use an authentication server 1002. Examples include, but are not limited to, sets of network policies 134 that together instantiate the various network "types" previously discussed (e.g., IoT, Small, Large, Internet Only, Guest, etc.), policies that allow for the bypassing of a captive portal 700 or content filter in certain circumstances, policies that establish schedules and schedule exceptions, policies that establish defaults and exceptions, and the like. These novel features may be implemented through the use of a plurality of Server-Assigned Attributes 1214 comprising at least one Vendor-Specific Attribute 1216, according to various implementations.

FIGS. 13A-13C are sequence diagrams of different non-limiting examples of how the mutable network system 1000 obtains the applied authentication asset 1200 in the context of the authentication process 1218, according to various implementations. Specifically, FIG. 13A is a sequence diagram of the authentication process 1218 in a non-limiting example of an implementation where the applied authentication asset 1200 is visible to the mutable network device 102 (in these non-limiting examples, the mutable network device 102 is also functioning as an access point 103), as was discussed in the context of FIG. 12A above. FIG. 13B is a sequence diagram of the authentication process 1218 in a non-limiting example of an implementation where the applied authentication asset 1200 is not visible to the mutable network device 102 due to the use of a secure tunnel between the client device 118 and the authentication server 1002, as discussed in the context of FIG. 12B. Finally, FIG. 13C is a sequence diagram of the authentication process 1218 in a non-limiting example of an implementation where the applied authentication asset 1200 is obtained by the authentication server 1002 and the associated set of network policies 134 is provisioned by the authentication server 1002 through one or more SAA 1214, as discussed in the context of FIG. 12C above.

FIGS. 13A-13C are sequence diagrams of different non-limiting examples of how the mutable network system 1000 obtains the applied authentication asset 1200 in the context of the authentication process 1218, according to various implementations. Specifically, FIG. 13A is a sequence diagram of the authentication process 1218 in a non-limiting example of an implementation where the applied authentication asset 1200 is visible to the mutable network device 102 (in these non-limiting examples, the mutable network device 102 is also functioning as an access point 103), as was discussed in the context of FIG. 12A above. FIG. 13B is a sequence diagram of the authentication process 1218 in a non-limiting example of an implementation where the applied authentication asset 1200 is not visible to the mutable network device 102 due to the use of a secure tunnel 1324 between the client device 118 and the authentication server 1002, as discussed in the context of FIG. 12B. Finally, FIG. 13C is a sequence diagram of the authentication process 1218 in a non-limiting example of an implementation where the applied authentication asset 1200 is obtained by the authentication server 1002 and the associated set of network policies 134 is provisioned by the authentication server 1002 through one or more SAA 1214, as discussed in the context of FIG. 12C above.

It should be noted that the authentication process 1218 shown in FIGS. 13A-13C are conventional variations within the RADIUS protocol. Specifically, FIGS. 13A and 13C show two non-limiting examples of a mutable network system 1000 implementing the EAP-TLS certificate-based authentication method, and FIG. 13B shows a non-limiting example of a mutable network system 1000 implementing a tunneled or asymmetric certificate-based method such as EAP-PEAP or EAP-TTLS. However, it should be noted that the contemplated mutable network system 1000, mutable network device 102, and method are not limited to the use of an authentication server 1002 using the RADIUS protocol. As previously discussed, according to various implementations the contemplated systems, methods, and devices may be adapted for use with other authentication systems, protocols, and methods, including those not yet developed.

FIG. 13A shows a sequence diagram for the authentication process 1218 in a mutable network system 1000 where the mutable network device 102 is able to receive the applied authentication asset 1200 directly from the client device 118. In this non-limiting example, there are two opportunities for this to happen. The authentication process 1218 begins with the standard initial communications between a client device 118 and an access point 103 (which in this case is the mutable network device 102), specifically, the Association-Request and Association-Response messages (not shown). Next the authentication process 1218 between the client device 118 and the authentication server 1002, via the access point 103/mutable network device 102, begins with the EAPOL Start message 1302. The access point 103 sends an EAP Request-Identity message 1304 asking the client device 118 who they are.

In practice, the EAP Response-Identity message 1306 may actually contain a username 1201 associated with the client device 118. In some implementations, the mutable network device 102 may receive the username 1201 from the client device 118 and use it, or part of it, as the applied authentication asset 1200. As shown, the mutable network device 102 (access point 103) then sends the username 1201 on to the authentication server 1002 as part of an Access-Request message 1308, as is known in the art.

However, in many cases this initial request for a username 1201 (e.g., the EAP Response-Identity message 1306) is simply a formality that is met with a meaningless answer such as "anonymous", which is readily accepted by the authentication server 1002 so the authentication process 1218 can move on to the next step. Specifically, the authentication server 1002 sends an Access-Challenge message 1310 to the mutable network device 102, which in turn sends an EAP Request-Authentication message 1312 to the client device 118, this time asking for something more substantive. In the non-limiting example shown in FIG. 13A, which is implementing the EAP-TLS protocol, the request is for the client device 118 to provide a certificate 1204, which it does as part of an EAP Response-Authentication message 1314. This represents another opportunity for the mutable network device 102 to receive an applied authentication asset 1200 from the client device 118.

As is known in the art, a certificate 1204 (e.g., an X.509 certificate) is verifiable through a trusted certificate authority and public/private key encryption, meaning it can be sent in the clear without compromising the security of the wireless network 116. The mutable network device 102, which is passing the certificate 1204 along to the authentication server 1002 in an Access-Request message 1308, can receive the applied authentication asset 1200 during this interaction. According to various implementations, the applied authentication asset 1200 may be a field 1206, or part of a field 1206, belonging to a certificate 1204 used by the client device 118 to authenticate.

Continuing with the authentication process 300, the authentication server 1002 receives and verifies the certificate 1204, and responds to the mutable network device 102 (i.e. access point 103) with an Access-Accept message 1316 or an Access-Reject message, as is known in the art. In the specific, non-limiting examples shown in FIGS. 13A-13C, the authentication is successful and an Access-Accept message 1316 is sent. The Access-Accept message 1316 comprises, or may comprise, a number of elements. For the purposes of the discussion in the context of FIG. 13A, only a Master Session Key 1318 is shown, but the message 1316 could also comprise one or more SAA 1214.

One of the advantages provided by the implementations of the mutable network system 1000 exemplified by FIG. 13A is that the authentication server 1002 (e.g., RADIUS server) can be completely ignorant of the use of the mutable network device 102 and the mutable network system 1000 in general. Thus, FIG. 13A only shows the one output from the authentication server 1002 of consequence in these implementations, the MSK 1318. As previously mentioned, the MSK 1318 is subsequently used in the post-authentication key exchange 1322 between the client device 118 and the mutable network device 102 (e.g., a four-way handshake 400), and is the reason why the previously discussed method of using the passphrase provided in the four-way handshake 400 is not compatible with centrally authenticated systems.

FIG. 13B shows a sequence diagram for the authentication process 1218 in a mutable network system 1000 where the applied authentication asset 1200 is not visible to the mutable network device 102 due to the use of a secure tunnel 1324 between the client device 118 and the authentication server 1002, as discussed in the context of FIG. 12B. This non-limiting example is representative of tunneled or asymmetric-certificate based authentication methods such as EAP-PEAP or EAP-TTLS, where authentication is performed using a credential 1300 (e.g., a certificate 1204, a username 1201 passphrase pair, etc.) that is sent from the client device 118 to the authentication server 1002 via a secure tunnel 1324. Before discussing these implementations, it should be noted that even though FIG. 13B is showing the use of a different authentication process 1218 than FIG. 13A, the username 1201 provided in the EAP Response-Identity message 1306 could still serve as the applied authentication asset 1200 in some implementations, as previously discussed in the context of FIG. 13A.

According to various implementations, the secure tunnel 1324 is created between the client device 118 and the authentication server 1002 using the server's certificate 1204, which is provided to the mutable network device 102 in the Access-Challenge message 1310, and then to the client device 118 in the EAP Request-Authentication message 1312, as shown. Because the mutable network device 102 read anything moving through the secure tunnel 1324, if it cannot get the applied authentication asset 1200 when a username 1201 is sent in the clear then it is reliant on the authentication server 1002 to provide the applied authentication asset 1200.

According to various implementations, the authentication server 1002 may provide the applied authentication asset 1200 to the mutable network device 102 as a SAA 1214. In some implementations it may be a standard SAA 1214 defined by the protocol (e.g., the User-Name attribute). In other implementations, the SAA 1214 may be a Vendor-Specific Attribute 1216 that may be specific to the mutable network system 1000.

Finally, FIG. 13C shows a sequence diagram for the authentication process 1218 in a mutable network system 1000 where the applied authentication asset 1200 is obtained by the authentication server 1002 and the associated set of network policies 134 is provisioned by the authentication server 1002 through one or more SAA 1214, as discussed in the context of FIG. 12C above. It should be noted that while the non-limiting example shown in FIG. 13C is using the EAP-TLS method that was demonstrated in FIG. 13A, other methods including but not limited to EAP-PEAP and EAP-TTLS would work as well. This is because, in some implementations, the authentication server 1002 may fill some roles that are performed by the mutable network device 102 in other implementations. Specifically, in some implementations the authentication server 1002 may receive the applied authentication asset 1200 and use it to identify an associated set of network policies 134. As discussed in the context of FIG. 12C, these policies are enforced through the use of a plurality of SAA 1214 sent by the authentication server 1002 to the mutable network device 102, which may include at least one VSA 1216, according to various implementations.

Where the above examples, implementations and implementations reference examples, it should be understood by those of ordinary skill in the art that other mutable network systems, devices, and methods could be intermixed or substituted with those provided. In places where the description above refers to particular implementations of a mutable network system, device, and method, it should be readily apparent that a number of modifications may be made without departing from the spirit thereof and that these implementations and implementations may be applied to other to wireless network management technologies as well. Accordingly, the disclosed subject matter is intended to embrace all such alterations, modifications and variations that fall within the spirit and scope of the disclosure and the knowledge of one of ordinary skill in the art.

What is claimed is:

1. A mutable network device for a wireless network, comprising:

a wired network interface communicatively coupled to a wired network;

a processor and a memory, the processor communicatively coupled to the wired network interface and configured to:

define a first set of network policies and associate the first set of network policies with a first authentication asset;

define a second set of network policies and associate the second set of network policies with a second authentication asset, the second authentication asset being different from the first authentication asset;

receive an applied authentication asset that is related to a client device engaging in an authentication process to secure a network connection between the client device and a wireless network;

determine if the applied authentication asset matches one of the first authentication asset and the second authentication asset;

receive a confirmation from an authentication server that the client device has been authenticated; and configure a traffic kernel module to provide the network connection to the client device, the network connection defined at least in part by the first set of network policies if the applied authentication asset is the first authentication asset and defined at least in part by the second set of network policies if the applied authentication asset is the second authentication asset;

wherein the first set of network policies and the second set of network policies each comprise at least one network policy;

wherein each network policy describes a network functionality to be provisioned through the network connection;

wherein the first set of network policies differs from the second set of network policies by at least a unique network policy that is found exclusively in one of the first set of network policies and the second set of network policies.

2. The mutable network device of claim 1, wherein the authentication server is a RADIUS server.

3. The mutable network device of claim 1, wherein the applied authentication asset is received from the client device while the client device is engaging in the authentication process.

4. The mutable network device of claim 3, wherein the applied authentication asset is at least part of a username.

5. The mutable network device of claim 4, wherein the processor is further configured to:

receive the username from the client device; and send an Access-Request message comprising the username to the authentication server.

6. The mutable network device of claim 1, wherein the applied authentication asset is received from the authentication server as part of the authentication process, the applied authentication asset being a Server-Assigned Attribute.

7. The mutable network device of claim 6, wherein the Server-Assigned Attribute is a Vendor-Specific Attribute.

8. The mutable network device of claim 1, wherein the processor is further configured to:

define a default network policy comprising a network functionality that is applied to every network connection;

determine if the network functionality is preempted by another network policy being enforced in response to the client device completing the authentication process; and apply the network functionality of the default network policy to the network connection unless the network functionality is determined to be preempted;

wherein the unique network policy comprises a policy exception that preempts and negates the default network policy.

9. The mutable network device of claim 1, wherein the unique network policy is a scheduled network policy comprising a schedule and a network functionality that is periodically applied to the network connection according to the schedule.

10. The mutable network device of claim 9, wherein the network functionality is a network access that is only available according to the schedule.

11. The mutable network device of claim 10, wherein the processor is further configured to:

redirect the client device to a captive portal in response to the client device attempting to utilize the network access at a time prohibited by the schedule;

wherein the captive portal comprises a user interface through which a schedule exception can be requested.

12. The mutable network device of claim 1, wherein the unique network policy applies a filter to the network connection.

13. A method for modifying functionality within a wireless network based on an applied authentication asset, comprising:

defining a first set of network policies associated with a first authentication asset for the wireless network;

defining a second set of network policies associated with a second authentication asset for the wireless network, the second authentication asset being different from the first authentication asset;

determining if the applied authentication asset used by a client device while engaging in an authentication process with an authentication server to secure a network connection with the wireless network matches one of the first authentication asset and the second authentication asset; and providing the network connection to the client device through a mutable network device, the network connection defined at least in part by the first set of network policies if the applied authentication asset is the first authentication asset and defined at least in part by the second set of network policies if the applied authentication asset is the second authentication asset;

wherein the first set of network policies and the second set of network policies each comprise at least one network policy;

wherein each network policy describes a network functionality and governs the circumstances in which the network functionality is applied to the network connection, the network functionality being at least one of a network access, a network capacity, and a network resource;

wherein the first set of network policies differs from the second set of network policies by at least one unique network policy that is found exclusively in one of the first set of network policies and the second set of network policies.

14. The method of claim 13, wherein the authentication server is a RADIUS server.

15. The method of claim 13, wherein the applied authentication asset is received from the client device while the client device is engaging in the authentication process.

16. The method of claim 15, wherein the applied authentication asset is at least part of a username.

17. The method of claim 16, further comprising:

receiving the username from the client device; and sending an Access-Request message comprising the username to the authentication server.

18. The method of claim 15, wherein the applied authentication asset is at least part of a field of a certificate.

19. The method of claim 18, wherein the applied authentication asset is at least part of one of a common name, an organization name, and an organizational unit name from the certificate.

20. The method of claim 13, wherein the applied authentication asset is received by the mutable network device from the authentication server as part of the authentication process, the applied authentication asset being a Server-Assigned Attribute.

21. The method of claim 20, wherein the applied authentication asset is a Vendor-Specific Attribute.

22. The method of claim 13:

communicating one of the first set of network policies and the second set of network policies to the mutable network device through a plurality of Server-Assigned Attributes comprising at least one Vendor-Specific Attribute;

wherein the applied authentication asset is received by the authentication server as part of the authentication process;

wherein the authentication server determines if the applied authentication asset matches one of the first authentication asset and the second authentication asset;

wherein the network connection provided to the client device through the mutable network device is defined at least in part by the plurality of Server-Assigned Attributes received by the mutable network device from the authentication server, the plurality of Server-Assigned Attributes specifying at least the unique network policy.

23. The method of claim 13, further comprising:

defining a default network policy comprising a network functionality that is applied to every network connection provided through the mutable network device unless preempted by another network policy;

wherein the unique network policy comprises a policy exception that preempts and negates the default network policy.

24. The method of claim 13, wherein the unique network policy comprises a schedule and a network functionality that is available according to a schedule.

25. The method of claim 24, wherein the network functionality is a network access that is only available according to the schedule.

26. The method of claim 25, further comprising:

redirecting the client device to a captive portal in response to the client device attempting to utilize the network access at a time prohibited by the schedule;

wherein the captive portal comprises a user interface through which a schedule exception can be requested.

27. The method of claim 13, further comprising:

configuring a traffic kernel module within the mutable network device to provide the network connection to the client device upon successful completion of the authentication process, the network connection defined at least in part by the first set of network policies if the applied authentication asset is the first authentication asset and defined at least in part by the second set of network policies if the applied authentication asset is the second authentication asset.

* * * * *